(12) United States Patent
Coiner

(10) Patent No.: US 9,922,575 B2
(45) Date of Patent: Mar. 20, 2018

(54) VICARIOUS COACHING

(71) Applicant: Charles Edward Coiner, Austin, TX (US)

(72) Inventor: Charles Edward Coiner, Austin, TX (US)

(*) Notice: Subject to any disclaimer, the term of this patent is extended or adjusted under 35 U.S.C. 154(b) by 0 days.

(21) Appl. No.: 14/961,548

(22) Filed: Dec. 7, 2015

(65) Prior Publication Data
US 2016/0253919 A1    Sep. 1, 2016

Related U.S. Application Data

(63) Continuation-in-part of application No. 13/956,116, filed on Jul. 31, 2013, now abandoned, which is a
(Continued)

(51) Int. Cl.
*A63F 9/24* (2006.01)
*G09B 19/00* (2006.01)
*A63F 13/25* (2014.01)
*A63F 13/58* (2014.01)
(Continued)

(52) U.S. Cl.
CPC .......... *G09B 19/0038* (2013.01); *A63F 13/25* (2014.09); *A63F 13/31* (2014.09);
(Continued)

(58) Field of Classification Search
CPC ........... G09B 19/0038; G06F 17/30398; G06F 17/30823; G06F 17/3082; G07F 17/32;
(Continued)

(56) References Cited

U.S. PATENT DOCUMENTS 6,394,895 B1 *   5/2002   Mino ............... A63F 13/005
                                                273/139
2009/0256688 A1 * 10/2009 Khan ............... A63B 24/0021
                                                340/323 R
(Continued)

OTHER PUBLICATIONS

Allen, Kevin. Sports Pros(e) interviews Anthony White, EA Sports playbook designer for Madden NFL 10. blogs.suntimes.com. Online. May 5, 2009. Accessed via the Internet. Accessed Mar. 23, 2015. <URL: http://blogs.suntimes.com/sportsprose/2009/05/interview_with_anthony_white_p.html>.*

*Primary Examiner* — Dmitry Suhol
*Assistant Examiner* — Carl V Larsen
(74) *Attorney, Agent, or Firm* — Jackson Walker L.L.P.

(57) ABSTRACT

A vicarious coaching method included generating a plurality of play selection user interfaces associated with a first team playing football against a second team, The play selection user interfaces include a first play selection user interface corresponding to a first play parameter and indicating a plurality of first play parameter options. The first play selection user interface is generated based on historical data indicative of previous plays executed by the first team. Responsive to receiving user inputs to the plurality of play selection user interfaces, a play called by the user is identified. Responsive to obtaining play identification information indicative of a play executed by the first team and a result of the play executed, the play called by the user is then scored based on the play executed by the first team and the result of the play executed.

17 Claims, 24 Drawing Sheets

Related U.S. Application Data continuation-in-part of application No. 13/758,862, filed on Feb. 4, 2013, now abandoned.

(60) Provisional application No. 61/594,738, filed on Feb. 3, 2012, provisional application No. 62/008,350, filed on Dec. 5, 2014.

(51) Int. Cl.

| | | |
|---|---|---|
| *A63F 13/533* | (2014.01) | |
| *A63F 13/46* | (2014.01) | |
| *A63F 13/31* | (2014.01) | |
| *G06F 17/30* | (2006.01) | |
| *G07F 17/32* | (2006.01) | |
| *G07F 17/38* | (2006.01) | |

(52) U.S. Cl.
CPC ............ *A63F 13/46* (2014.09); *A63F 13/533* (2014.09); *A63F 13/58* (2014.09); *G06F 17/3082* (2013.01); *G06F 17/30398* (2013.01); *G06F 17/30823* (2013.01); *G07F 17/32* (2013.01); *G07F 17/3274* (2013.01); *G07F 17/38* (2013.01)

(58) Field of Classification Search
CPC .......... G07F 17/38; A63F 13/25; A63F 13/58; A63F 13/533; A63F 13/46; A63F 13/31
See application file for complete search history.

(56) References Cited

U.S. PATENT DOCUMENTS

| | | | | |
|---|---|---|---|---|
| 2013/0060362 | A1* | 3/2013 | Murphy | A63F 13/65 700/93 |
| 2014/0236331 | A1* | 8/2014 | Lehmann | G09B 19/0038 700/93 |
| 2015/0169960 | A1* | 6/2015 | Laksono | G06K 9/4652 382/170 |

* cited by examiner

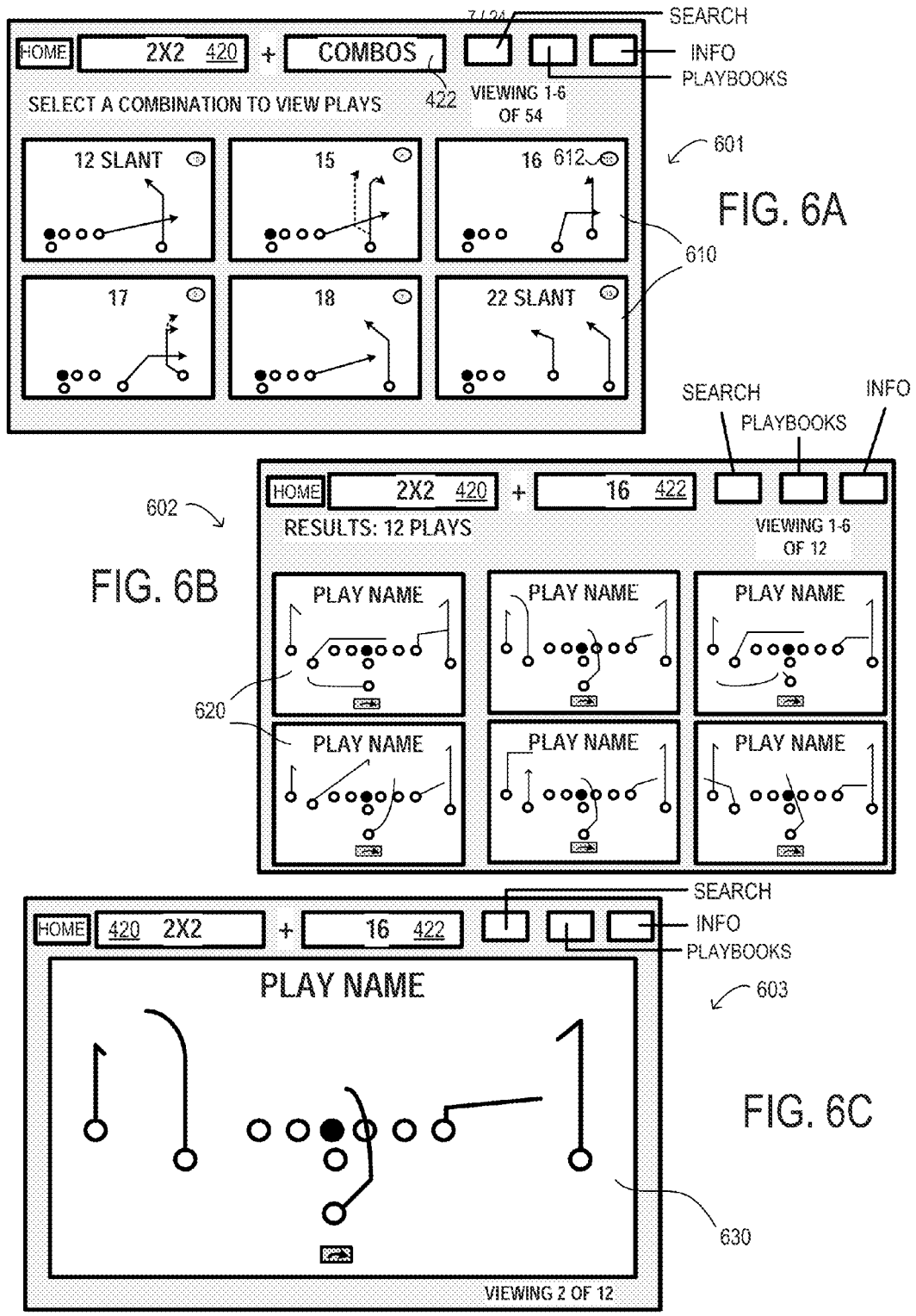

| 1ST DOWN 2102-1 | | 2ND DOWN 2102-2 | |
|---|---|---|---|
| DISTANCE | RESULT | DISTANCE | RESULT |
| 1 | 1+ | 1 | 1+ |
| 2 | 2+ | 2 | 2+ |
| 3 | 3+ | 3 | 3+ |
| 4 | 3+ | 4 | 3+ |
| 5 | 3+ | 5 | 3+ |
| 6 | 3+ | 6 | 3+ |
| 7 | 3+ | 7 | 4+ |
| 8 | 4+ | 8 | 5+ |
| 9 | 4+ | 9 | 6+ |
| 10 | 4+ | 10 | 7+ |
| 11 | 5+ | 11 | 7+ |
| 12 | 6+ | 12 | 8+ |
| 13 | 7+ | 13 | 9+ |
| 14 | 7+ | 14 | 9+ |
| 15 | 8+ | 15 | 10+ |
| 16+ | 50%+ | 16+ | 67%+ |

| 3RD DOWN 2102-3 | | 4TH DOWN 2102-4 | |
|---|---|---|---|
| DISTANCE | RESULT | DISTANCE | RESULT |
| 1 | 1+ | 1 | 1+ |
| 2 | 2+ | 2 | 2+ |
| 3 | 3+ | 3 | 3+ |
| 4 | 4+ | 4 | 4+ |
| 5 | 5+ | 5 | 5+ |
| 6 | 6+ | 6 | 6+ |
| 7 | 7+ | 7 | 7+ |
| 8 | 8+ | 8 | 8+ |
| 9 | 9+ | 9 | 9+ |
| 10 | 10+ | 10 | 10+ |
| 11+ | 100%+ | 11+ | 100%+ |

FIG. 21

1ˢᵀ AND GOAL — 2202-1
DISTANCE  RESULT — 2206
2204
| DISTANCE | RESULT |
|---|---|
| 1 | TD |
| 2 | TD |
| 3 | 2+ |
| 4 | 2+ |
| 5 | 3+ |
| 6 | 3+ |
| 7 | 4+ — 2210 |
| 8 | 4+ |
| 9 | 5+ |
| 10 | 5+ |

2ⁿᵈ AND GOAL — 2202-2
| DISTANCE | RESULT |
|---|---|
| 1 | TD |
| 2 | TD |
| 3 | TD |
| 4 | 3+ |
| 5 | 4+ |
| 6 | 5+ |
| 7 | 5+ |
| 8 | 6+ |
| 9 | 7+ |
| 10 | 8+ |

3RD AND GOAL — 2202-3
| DISTANCE | RESULT |
|---|---|
| 1 | TD |
| 2 | TD |
| 3 | TD |
| 4 | TD |
| 5 | TD |
| 6 | TD |
| 7 | 6+ |
| 8 | 7+ |
| 9 | 8+ |
| 10 | 9+ |

4TH AND GOAL — 2202-4
| DISTANCE | RESULT |
|---|---|
| 1 | TD - |
| 2 | TD - |
| 3 | TD - |
| 4 | TD - |
| 5 | TD - |
| 6 | TD - |
| 7 | TD |
| 8 | TD |
| 9 | TD |
| 10 | TD + |

VICARIOUS COACHING

This application claims priority to U.S. Provisional Application No. 62/008,350, filed Dec. 5, 2014, and is a continuation in part of application Ser. No. 13/956,116, entitled FOOTBALL PLAY SELECTION APPLICATIONS, filed Jul. 31, 2013, which is a continuation in part of application Ser. No. 13/758,862, entitled ELECTRONIC FOOTBALL PLAYBOOK filed Feb. 4, 2013, which claims priority to application Ser. No. 61/594,738, filed Feb. 3, 2012, entitled PLAYBOOK MOBILE APPLICATION, all of which are, in their entireties, incorporated by reference herein.

BACKGROUND

Field

The present disclosure relates to the sport of North American football and, more specifically, electronic databases containing information relevant to football.

Background

North American football is an athletic game characterized by a sequence of distinct plays, each of which begins when movement of the ball is initiated by the team in possession of the ball and each of which has a distinct ending. Between plays, the players on the field for each team may huddle to identify the next play that the team will execute. In this context, a play refers to a predetermined set of one or more tasks or assignments for each player on the team. At the most general level, a team will execute three categories of plays, namely, offense, defense, and special teams, sometimes referred to as kicking plays. Of these three categories, the offense category is the category that includes the most variation and is often the category that is most often associated with the concept of play calling. Although there was a time in the history of football when offensive play calling may have been delegated to the team's quarterback, play calling is generally the responsibility of one or more coaches, usually the team's head coach or offensive coordinator.

Those who are involved with the game (e.g., coaches, players, personnel departments) strive to adopt a playing style that is best suited for their team. Historically, this has been accomplished by studying playbooks, video, attending clinics, and reading books authored by coaches who have had previous success in a particular system of plays. The plays may then be organized in a playbook, from which the coaches choose plays that fit the personnel and philosophy of their football team.

In practice, the plays are chosen from different systems using different vocabularies. Once the plays are chosen, the coaches adopt or create a vocabulary to identify the plays that may be unique to their football team. Using this vocabulary, the coaches may organize a group of plays into a playbook, a hardcopy or electronic collection of static images of plays. However, as the complexity of the game has evolved, the limitations of hardcopy playbooks have become more pronounced. Just as a few examples, coaches using a simple playbook often find it difficult to locate plays they have used previously. More generally, accessing a particular play at any point in time is difficult with a conventional playbook. The playbook may also provide limited support of searching for plays using relevant criteria, which can be a significant challenge when a large number of plays are being managed. Moreover, football is a game that requires multiple assistant coaches communicating with a head coach and issues of access, distribution, and coherency arise with hardcopy playbooks. In addition, as the popularity of football has increased and consumer electronics and technology have evolved, opportunities for interactive consumer involvement with the game, including vicarious coaching applications, have arisen.

BRIEF DESCRIPTION OF THE DRAWINGS

FIG. 6A, FIG. 6B, and FIG. 6C illustrate additional user interfaces for selecting one or more plays from an electronic database of plays;

FIG. 21 illustrates a success table for determining whether the result of a play is a success or a failure;

FIG. 22 illustrates a success table similar to the success table of FIG. 21, for use in specified portions of the field;

DESCRIPTION OF EMBODIMENTS

Figure 1A:
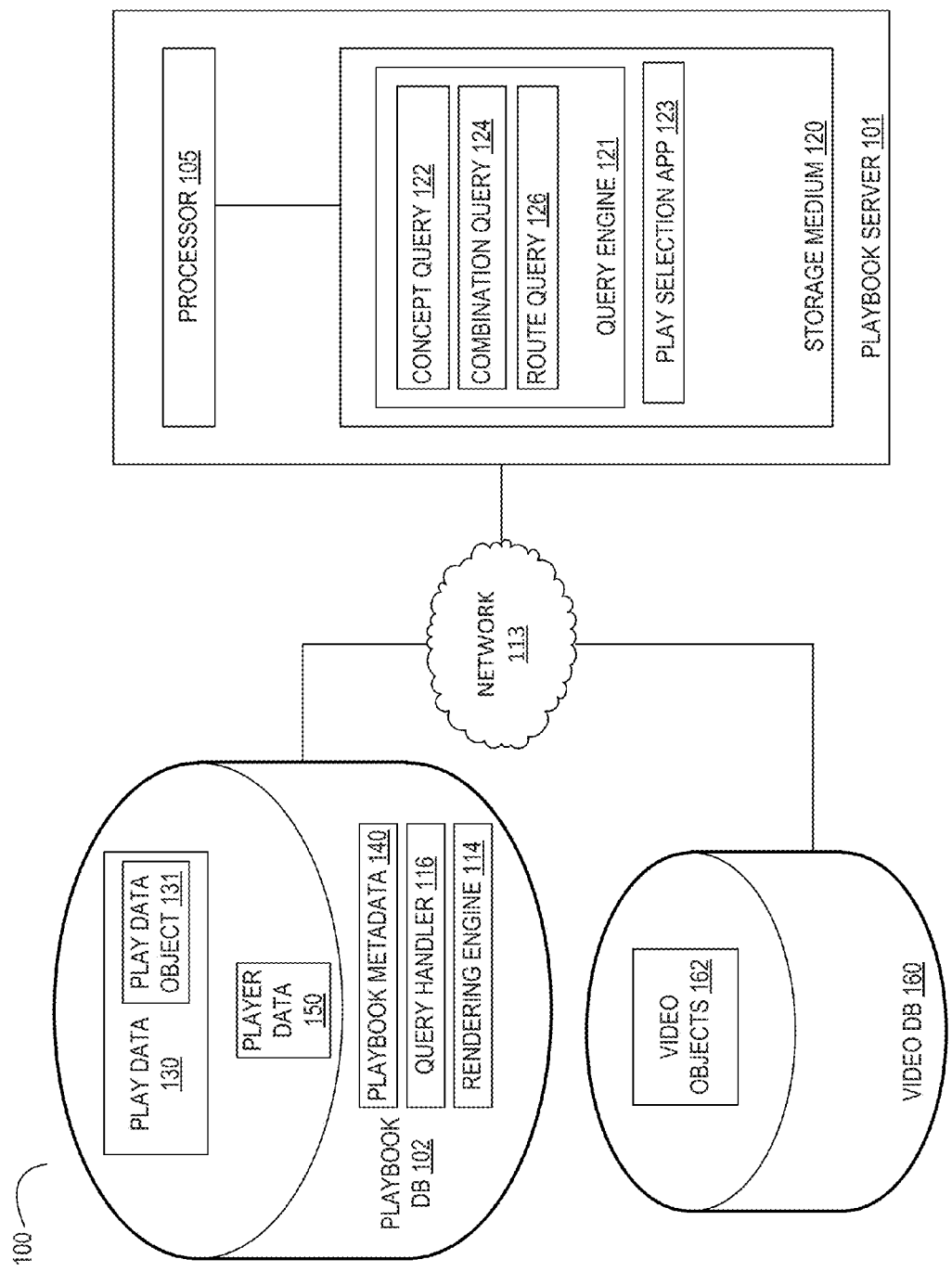
FIG. 1A and FIG. 1B illustrates a playbook system.

North American football involves two teams playing against each other in an offensive and defensive formation.

The game involves individual plays from a line-of-scrimmage where the football is placed based on results of a previous play. For each game, coaches and players may come up with a plan to achieve their objectives, including developing a playbook for planning specific actions and strategies during the game. In Table 1 below, terminology that shall be used herein regarding plays is defined.

TABLE 1

Terminology for Plays

| TERM | DEFINITION |
| --- | --- |
| formation | an initial location of players at the beginning of a play |
| play | depending on the context, a play shall refer to: 1) an actual unit of a football game performed by the players; or 2) information or data indicating the combination of a formation and one or more routes assigned to one or more positions, and may be electronic or tangible |
| play image | a graphical representation of a play, illustrating a formation and one or more routes for one or more positions |
| playbook | a collection of plays, whether electronic or tangible |
| player | an individual assigned to any of the positions |
| position | a position indicates an initial location for one of the players and suggests a set of routes that the indicated player may have to perform |
| route, position-route | a path of travel, assigned to a position for a specified play, that the player assigned to the position is expected to execute during the play |
| point of scrimmage | location of the ball at the beginning of a play, also defines a line-of-scrimmage |

An electronic playbook may be in the form of an application for managing plays and may include features for creating and filtering plays based on factors such as the formation used and the routes assigned to one or more positions. In certain embodiments, the application may be used on a tablet, a smart phone, or another suitable mobile device and may communicate with a database of plays referred to herein as a playbook database. The application may also be used on a laptop, notebook, desktop, server, or other computer system that is either mobile or stationary. The playbook database may be located on a remote server or locally and may include various types of data related to plays, as will be described in further detail herein. The plays in the database may include a standard set of "stock" plays and may be customized to include plays specific to coach or team. Ownership of the playbook database is an implementation detail and the playbook application can interact with any playbook database that has a compliant informational structure.

In some implementations, the application enables a user to identify, select, or otherwise access plays in the playbook database via a query including, as examples, a concept query, a combination query, or a route query. The query may be executed by the application in response to user input at the application interface. Based on the database query, the application interface may enable the user to identify and view one or more plays according to various criteria. For example, the concept query and the combination query may represent predefined search criteria for implementing higher level access to the playbook database that allows the user to focus on a given position-route, a tactical responsibility for one or more position(s), or a strategic objective of position-routes for a given play.

In addition to the ability to identify existing plays in the playbook database, at least one embodiment of the playbook application enables the user to design a new play and add it to the database. For example, a user may select a formation and associate the formation with a new combination of one or more routes to be executed by one or more receivers to create a new play, which may then be added to the playbook database.

In some embodiments, the application may enable selection of the concept query using a touch interface and a displayed concept button and may allow the user to intuitively choose and view plays conceptually organized by strategies commonly applied to the game of football. In some embodiments, the application may enable selection of the combination query using a touch interface and a displayed half-field combo button and may allow the user to intuitively choose and view plays organized by route combinations for two or more players on one side of the formation. In some embodiments, the application may enable selection of the route query using a touch interface and a displayed any-route button and may enable selection of plays based on formation and the individual routes of one or more positions (i.e., receivers) by presenting the user with touch-selectable display screens for selecting a formation, a designated receiver or other position in the formation, and a particular route or responsibility that the designated position may have in the selected formation.

The application may further enable the user to identify, name, rename, group, edit, and/or save plays to a playbook that may be created, maintained, and/or distributed by the user, for example, to a team of additional users. In this manner, the application may allow a user to create playbooks for specific game circumstances. The application may support the distribution, by email or otherwise, of plays and playbooks to other users. Playbooks may include attributes for defining specific categories of players based on age, ability, or other factors, specific down-and-distance situations, specific opponents, specific weather conditions, and so forth. The application may also provide access to video associated with specific plays, which may be a desired convenience for coaches and players. In one embodiment, the route query may be used to integrate with video to enable the user to find plays intuitively. In some embodiments, the user may choose a route using the any-route button and watch video clips of some or all plays that include a specific route for a specific position.

Although the specific examples presented herein for descriptive clarity depict pass game plays in offensive football, the application may be used to specify formations and position-routes for various game plays. The application may be used for various aspects of offensive football including the run game, play action pass game, as well as situational football including red zone plays, third down plays, short yardage plays and goal line plays. The application may be used for defensive football including finding defenses by fronts, front adjustments, stunts, dogs, blitzes, and secondary coverages. The application may be used for special teams including punt, punt return, kickoff, kickoff return, point after attempts and field goals, point after attempt blocks and field goal blocks.

In one aspect, a disclosed method for accessing plays may include receiving user input indicating a search criteria, identifying, from a database, plays matching the search criteria, and enabling a user to select the plays matching the search criteria. The search criteria may specify at least one of: a formation and a position-route.

In certain embodiments, the database may store formation data for the formation, while the formation includes location data for each of a plurality of positions in the formation, and position data for each of the plurality of positions. The location data may specify a start location, relative to a point of scrimmage, in the formation, while the position data may specify a position identifier for a position in the formation. The database may store position-route data for the position-route. The position-route data may specify a designated route for a designated position in the formation, the designated route originating from the start location for the designated position. The method operation of enabling the user to select the plays may include generating a play image for a first play matching the search criteria. The play image may represent formation data and position-route data associated with the first play. The method operation of generating the play image for the first play may include at least one of retrieving at least a portion of the play image from the database, and rendering the play image using the formation data and the position-route data. The search criteria may specify the position-route, wherein the user input comprises a user-defined route for a position. The user-defined route may be received as a touch input from the user. The method may further include enabling the user to selectively access portions of a video matching the search criteria.

In particular embodiments, the method may include enabling the user to create a playbook, including specifying a playbook identifier for the playbook, and enabling the user to access the playbook. Accessing the playbook may include at least one of accessing the playbook using the playbook identifier, adding a play to the playbook, deleting a play from the playbook, and modifying metadata associated with a play in the playbook.

In another aspect, a disclosed database system for retrieving plays may include a processor configured to access memory media, and a database of plays, including formation data and position-route data for each play stored in the database. The memory media may include instructions executable by the processor. The instructions, when executed by the processor, may cause the processor to perform operations including receiving a search criteria describing plays, issuing a query to the database for plays matching the search criteria, and outputting the plays resulting from the query. The search criteria may specify at least one of a formation and a position-route.

In certain embodiments, the memory media may include instructions for receiving play data describing a new play, and adding the play data received to the database. The play data may include formation data and position-route data for the new play. The database accommodates, for each play, metadata selected from a concept identifier describing a general football concept, a combination identifier describing position-route data for at least two positions, a play identifier, a playbook identifier, a formation identifier, a plurality of player data identifiers, a video identifier, and position-route identifiers for each of a plurality of positions. The search criteria include at least one of the concept identifier and the combination identifier.

In yet another aspect, transitory computer readable memory media may store executable instructions to receive user input indicating a search criteria, retrieve, from a database, plays matching the search criteria, and enable a user to select the plays matching the search criteria. The search criteria may specify at least one of a formation and a position-route.

In a different aspect, a vicarious coaching method includes generating, for a user of a vicarious coaching application, sometimes referred to herein as a vicarious coach, a plurality of play selection user interfaces associated with a football game between a first team and a second team. The vicarious coaching application user provides one or more inputs to all or some of the play selection user interfaces to define the play called by the vicarious coach. Each play selection user interface corresponds to a play parameter, indicates a plurality of first play parameter options, and prompts the vicarious coach to select one of the options.

In at least one embodiment, the method provides, for each play, a sequence of three play selection user interfaces to the vicarious coaching user who is calling plays for the team on offense. In at least one embodiment, the three play selection user interfaces include (1) a play-type user interface corresponding to a play-type parameter indicating a type of play, e.g., run play, pass play, kicking play; (2) a player or position user interface corresponding to a player-position parameter indicating an individual player or a specific position as the intended receiver for a pass play and the runner for a run play; and (3) an assignment or route user interface corresponding to an assignment parameter indicating a pass route for the intended receiver of a pass play or a running lane for the runner in a run play.

In some embodiments, one or more of the play selection user interface indicates or is influenced by or based on historical data indicative of plays executed by the first team during a particular historical interval, e.g., the current season, the last ten games, etc. For example, the play-type user interface may indicate, for each play type parameter option, a historical percentage indicating, as a percentage, a historical likelihood indicative of the historical tendency of the applicable team to execute a play of the applicable play type during the historical interval. As a non-limiting example, if the applicable team executed 38% run plays, 60% pass plays, and 1% kicking plays during the historical interval, the play-type user interface may indicate a value of 38% for the run option, 60% for the pass option, and 1% for the kick option.

The user inputs provided to the plurality of play selection user interfaces collectively define the play called by the vicarious coach. After the team on the field executes the next play, executed play information is received or obtained. In at least one embodiment, the executed play information includes play identification information indicative of the play executed by the first team and result information indicative of a result of the play executed. The play identification information may identify the play by identifying a play parameter corresponding to each of the play parameters selected by the vicarious coach before the play was executed. For example, if the vicarious coach identifies the play by specifying a play type, an intended target, and an assignment, the play identification information may indicate values for the same three parameters.

In at least one embodiment, play result information included in the executed play information indicates a degree of success or failure of the executed play according to a particular set of one or more criteria. In at least one embodiment, the play result information is binary, indicating the executed play as either a successful play or a failure. The determination of success or failure in this embodiment may be based on an algorithm, rule set, or table-based look up. In some embodiments, success or failure may be determined based primarily on down-and-distance information and yardage gained information.

Historical data provided via any play selection user interfaces may be calculated or otherwise determined based on a historical play set that is a subset of all plays executed by the applicable team during the historical interval. In some embodiments, the set of all plays executed by the applicable team during the historical interval may be filtered with respect to situational criteria. For example, some embodiments may filter historical percentages indicated in a play-type user interface based on down-and-distance information and line-of-scrimmage information so that, to illustrate, the historical percentages provided in a play-type user interface for an upcoming $1^{st}$ and 10 play at the team's own 40 yard line may differ from the historical percentages for an upcoming $3^{rd}$ and goal play at the opponent's 1 yard line.

The situational criteria used to filter the historical play set for purposes of determined historical percentages may include season criteria, recency criteria, down-and-distance criteria, game clock criteria, game score criteria, opponent criteria, player criteria, environmental criteria including temperature criteria, wind criteria, time of day criteria, and calendar-date criteria, and any other criteria corresponding to a characteristic of the team, the game, or the upcoming play.

Various methods may be employed to obtain the play identification information used to identify an executed play. In at least one embodiment, human "spotters" observe the game live or remotely, in real time, via broadcast television, cable television, etc., identify the play, i.e., identify values for each of the applicable play parameters, based on their observations, and communicate play identification information to a server or other computing device. In these embodiments, spotters may report the play identification information using the same sequence of play selection user interfaces used by the vicarious coach to call the play.

In some embodiments, the play identification information is derived from one or more high definition video signals comprising videos of the executed play from one or more perspectives. In still other embodiments, play identification information is determined based on tracking signals transmitted from radio frequency transmitters located on the football and on one or more players on the field. The transmitted signals may be received by a set of one or more radio frequency receivers and communicated to a specialized server or other form of processor to perform position resolution calculations and, based on the results, identify the executed play through comparison with the motion data associated with all or some of the plays in the historical play set. In still other embodiments, the football and one or more players on the field may be equipped with GPS-like radio frequency receivers. Each such radio frequency receiver may receive a set of signals from a set of fixed position radio frequency transmitters located at predetermined positions around the stadium. In this embodiment, play identification may be determined by remotely communicating position information from the radio frequency receivers to a server or other form of processor.

The vicarious coaching application player, who may be referred to herein simply as the vicarious coach, may be scored or otherwise evaluated following each called play. In at least one embodiment, multiple factor scoring is used wherein the score assigned to a called play is determined based on a combination of two or more factors. In at least one embodiment, scoring is determined based on a combination of similarity and success where similarity conveys the degree to which the play executed on the field and the play called by the vicarious coach are the same while success conveys whether or the degree to which the play executed on the field was successful. In at least one embodiment, success is indicated as a binary parameter indicating either success or failure. In some embodiments, greater similarity results in a higher score when the executed play is successful. In some embodiments, less similarity results in a higher score when the executed play is unsuccessful.

In at least one embodiment, determining similarity includes identifying a value for each of the play selection parameters and comparing each of the identified values to the corresponding value of the play called by the user. In at least one embodiment, identifying the result includes determining the result based at least on down-and-distance information yardage gained information. In some embodiments, the result may be further based on a situational factor, wherein the situational factor reflects, as non-limiting examples: line-of-scrimmage information, a game score, a game clock, the number of time outs, and so forth. For example, a play that might otherwise be deemed unsuccessful for failing to achieve adequate yardage may be successful in when the primary objective of the offense is to consume as much game clock time as possible.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Turning now to the drawings, FIG. 1 is a block diagram of selected elements of playbook system 100, which may also be referred to herein simply as playbook system 100. In at least one embodiment, playbook system 100 may be used to identify, select, access, review, and modify one or more plays from a database, referred to herein as playbook database 102 containing data, identified in FIG. 1 as play data 130 associated with a multitude of football plays. In at least one embodiment, playbook system 100 facilitates intuitive and efficient identification and selection of plays by combining drawings or illustrations that convey aspects of one or more plays with metadata that indicates a number of characteristics of a play. Play data 130 may define or characterize plays according to a number of predetermined parameters and a characteristic of a play may be associated with a particular value of a play parameter. Playbook database 102 may characterize some or all of the plays in play data 130 with respect to a number of parameters and the particular values associated with each parameter may define a corresponding characteristic of the play. For example, playbook database 102 may include data indicative of a value for a formation parameter associated with some or all of the plays in play data 130. In at least one embodiment a value for a particular parameter defines a characteristic of the corresponding play. Continuing with the formation parameter example, a formation parameter value of "5" may indicate plays that are executed out of a particular shotgun formation. In at least one embodiment, playbook database 102 includes a data structure identified as playbook metadata 140 that defines the metadata associated with the applicable playbook database 102. Playbook metadata 140 may include information identifying the various parameters with which a play may be described and the various values of each parameter that the database supports.

Playbook system 100 may be used in conjunction with any number of play selection applications. These applications include, as examples, playbook creation, modification, customization, and distribution, game preparation including film study and game plan development, and consumer or home-user play selection applications including "fantasy" play selection applications. At least one embodiment of playbook system 100 incorporates figures illustrating various aspects of particular plays within play data 130. A play selection application 123 hosted or supported by playbook system 100 may access, generate, display, or otherwise provide a sequence of one or more user interfaces, including the figures, to a user. Depending upon the application, the user may be skilled in the field of football strategy, football terminology, and the design and analysis of football plays, e.g., a coach or player. In other applications, the user may be a consumer or home user who is relatively unsophisticated in football strategy. By organizing playbook database 102 according to a relatively small number of play selection parameters and associating parameters with corresponding user interfaces that include visual depictions associated with the corresponding parameter, at least one embodiment of playbook system 100 facilitates rapid, intuitive, and efficient play selection regardless of the user's sophistication. Moreover, playbook database 102 may include team specific data including, as examples, player data 150 and play history data, not expressly depicted in FIG. 1, that facilitate a customization or optimization of play selection application 123 in which the user interfaces that the application generates and provides to a user reflect any tendencies that the team exhibits.

The playbook system 100 illustrated in FIG. 1 includes a playbook server 101 in communication with a playbook database 102 via a network 113. The playbook server 101 illustrated in FIG. 1 includes a processor 105 and a storage device, memory, or other form of tangible, computer-readable storage medium 120 that includes processor executable program instructions including instructions associated with a play selection application 123 and instructions associated with a query engine 121. Whenever processor 105 executes instructions stored in storage medium 120, the instructions cause processor 105 to perform operations including operations described herein.

The playbook system illustrated in FIG. 1 includes, in addition to playbook database 102, video database 160, also accessible to playbook server 101 via network 113. The video database 160 illustrated in FIG. 1 includes video objects 162. In some embodiments, video objects 162 correspond to a single play in a football game or practice. The play featured in a video object 162 may be associated with a coach's or player's own team or with another team such as an upcoming opponent. The video objects 162 may be tagged or otherwise associated with metadata characterizing the applicable play. In embodiments compatible with play selection application 123, for example, the video objects 162 in video database 160 may include metadata indicating values for the same parameters that play selection application 123 employs to identify plays. In these embodiments, play selection application 123 may be used in conjunction with pre-tagged video objects 162, to access film or other form of video content of a particular play or particular type of play and so forth.

In at least one embodiment, playbook database 101 is a database server or includes features and functionality of a database server to facilitate access to data stored in playbook database 102, including play data 130. Play data 130 may include a distinct play data object 131 pertaining to each unique play encompassed by a team or other football organization. Although the figures described herein emphasize offense, play data object 131, as is true with respect to other features of play selection application 123 and playbook system 100, encompass both defensive and special teams plays as well.

Figure 1B:
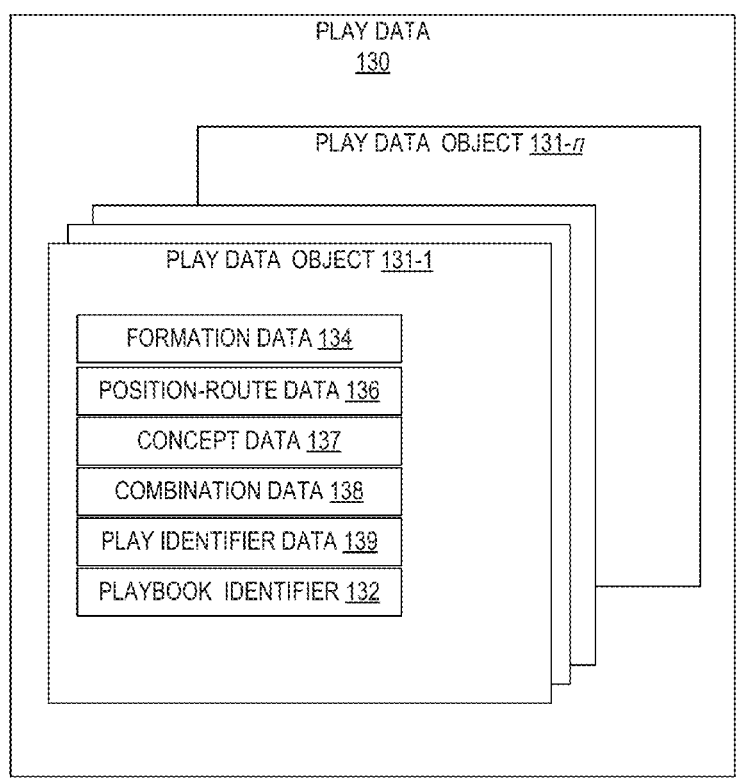

Referring to FIG. 1B, for example, play data 130 includes play data objects 131-1 through 131-n, each of the play data objects corresponding to one of n plays included within playbook database 102. Each play data object 131 may include values for a predetermined number of a play parameters that define a set of characteristics for the applicable play. With respect to play selection applications that present users with a sequence of one or more user interfaces, play data objects 131 may include data corresponding to each play selection parameter that a user must define or select. For example, if a play selection application requests users to select a formation, each play data object 131 may include data indicating the formation from which the play is executed. Play data objects 131 may include drawings or illustrations including formations and patterns executed by one or more players.

As depicted in FIG. 1B, each play data object 131 includes data corresponding to one or more parameters or characteristics of the play. The play data objects 131 depicted in FIG. 1B, for example, include formation data 134, corresponding to a formation parameter, which may illustrate or otherwise indicate initial location information for each position represented. Thus, formation data 134 may indicate the formation from which a play is executed. Accordingly, formation data 134 may include images, numerical data or a combination thereof conveying the starting position of each position. The start locations may be specified relative to an origin including, for example, a point of scrimmage representing a location from which the football will be snapped at the start of the next play. Thus, the location data may include 2-dimensional coordinates to specify start locations. Other origins may be arbitrarily used in different embodiments, such as a corner of a play image space. In some implementations, the formation refers more generally to the relative location of the players on the field rather than a set of specific locations. For example, a 2-back formation may refer to any formation in which, as an example, the formation includes five offensive linemen, one wide receiver on one side of the formation, a second wide receiver and a tight end on the other side of the formation, a quarterback "under" center, and two running backs behind the quarter back, one on either side of the quarterback.

In addition to location data, formation data 134 may include position data for each player illustrated in the formation. The position data, represented as position-route data 136, in FIG. 1B, may specify a position identifier for a given position. The position identifier may be a character that appears in the position in a play image and may be specified by a user or an entity using playbook system 100. The location data and the position data may be used to generate and/or render the play image of a play for display to a user. It is noted that a number of positions (including location data for the positions, and position data for the positions) may vary in number and scope, as desired. In other words, formation data 134 may be usable to specify a full and/or a partial implementation of a formation. In various embodiments, formation data 134 may be used to specify a plurality of formations, which may be individually accessed using a formation identifier.

The play data objects 131 illustrated in FIG. 1B include position-route data 136, which may include data and/or illustrations indicating designated routes for one or more designated positions. Unless a play calls for pre-snap motion for one or more positions, designated routes generally originate from the formation location assigned to the applicable position. Position-route data 136 may include a number of designated routes that are specified for a given position. Position-route data 136 may include designated routes for a plurality of positions. The designated route may be specified relative to the start location and may include 2-dimensional path data (not shown) at a desired level of granularity or precision. In certain embodiments, position-route data 136 may include position-route identifiers for each of a plurality of positions, whereby the position-route identifiers are used to access path data for the route. In certain embodiments, position-route data 136 may be maintained and/or rendered in image form by playbook database 102.

As suggested previously, playbook metadata 140 may include information defining the parameters or characteristics of a play that a play selection application requires or considers in selecting or otherwise identifying or accessing plays in playbook database 102. In addition to the formation parameter and the position-route parameter explained above, playbook metadata 140 may include a formation identifier for each play, along with position-route identifiers specifying position-route data 136 for desired positions for the play. Playbook metadata 140 may define or include references to additional play parameters for each individual play stored in playbook database 102. The play data object 131 depicted in FIG. 1B includes concept data 137 for a concept parameter; combination data 138 for a combination parameter that describes position-route data for at least two positions, a play identifier data 139 uniquely identifying a play, a playbook identifier 132 uniquely identifying a playbook; a formation identifier uniquely identifying a formation; a plurality of player data identifiers describing attributes (or desired attributes) of individual athletes assigned to positions; a video identifier; and position-route identifiers for each of a plurality of positions. In this manner, playbook metadata 140 may enable playbook system 100 to provide users with the ability to search and/or browse plays stored in playbook database 102 according to various criteria and relevant attributes of individual plays, as will be described in further detail herein.

Also shown in FIG. 1B, playbook database 102 includes play data 130. Play data 130 may be usable to generate playbooks, or collections of individual plays. Users may use play data 130 to create and store playbooks, but also to distribute playbooks to other users. For example, a football coach may prepare a playbook for an upcoming game and distribute the playbook electronically to players on the coach's team. Thus, play data 130 may include a playbook identifier, along with a plurality of play identifiers, to describe collections of plays in a playbook. In other embodiments, play data 130 may include rendered play images that are suitable for viewing and/or printing.

Still referring to FIG. 1, playbook database 102 is shown including player data 150, which may describe attributes of individual athletes who assume roles in positions. Player data 150 may be used to specify certain attributes of an athlete for a given play. For example, an age of an athlete may be used to discriminate certain plays (or entire playbooks) that are physically unsuitable for younger players. In certain embodiments, player data 150 may include attributes describing certain abilities of an individual athlete, such as a jump height, for example, which may be used to specify certain types of players in a play. Thus, certain plays stored in playbook database 102 may be linked, for example, using playbook metadata 140, to player data 150 to filter or specify attributes of players in positions.

As shown in FIG. 1, playbook database 102 also includes rendering engine 114, video database 160, and query handler 116. Rendering engine 114 may generate images, such as play images, from other data stored in playbook database 102, as described above. The rendered play images may be displayed to a user and/or included in a playbook. Video database 160 may provide access to football video that may be accessed and played back to a coach, player, or other user. In at least one embodiment, video database 160 may include a plurality of football video objects or links to externally stored football video objects. In some embodiments, the video objects in video database 160 include videos of individual plays executed by a team in a previous game or practice or earlier in a current game or practice. The team executing the plays in the video objects may be the next opposing team a coach or player has to play against or the coach's or player's own team. The video objects in video database 160 may be tagged with metadata indicating information about the corresponding play including, in at least one embodiment, indications of values for parameters used by a play selection application. For example, a video of a play that is executed out of a specific formation may be tagged with metadata indicating that the play represented in the corresponding video is executed out of the specific formation. In these embodiments, the user inputs to select one or more plays may be the same or similar user inputs to identify one or more videos in video database 160. The playbook database 102 depicted in FIG. 1 includes playbook metadata 140, which may include information defining the meaning of metadata used to tag video objects 162. Although video database 160 is depicted as a part of playbook database 102, other embodiments may encompass implementations in which video database 160 is stored in a different database than playbook database 102 and accessed by a different server or system.

Query handler 116 may be a module within playbook database 102 that is capable of receiving queries and outputting results of the received queries. Examples of queries that may be received by playbook database 102 shown in FIG. 1 are concept query 122, combination query 124, and route query 126, as described previously.

In operation, playbook system 100 may enable playbook database 102 to be populated with data and/or images representing plays. A user and/or a provider of playbook system 100 may populate playbook database 102 with plays. Once populated, a user may execute playbook application 232 (see FIG. 2) to access plays stored within playbook database 102. The access may include browsing or searching for individual plays using various criteria. For example, concept query 122 and combination query 124 may enable searching for plays based on high-level football concepts, while route query 126 may enable searching based on specific route paths for desired positions. The plays matching a received search criteria may be presented to the user as a collection of plays, which the user may view, browse, and/or select. Certain plays outputted to the user may be added to a playbook, which can be stored by the user and retrieved, for example, for distribution. Additionally, video segments of individual plays, when available, may be played back to a user of playbook application 232, and/or may be included with a playbook.

Figure 2:
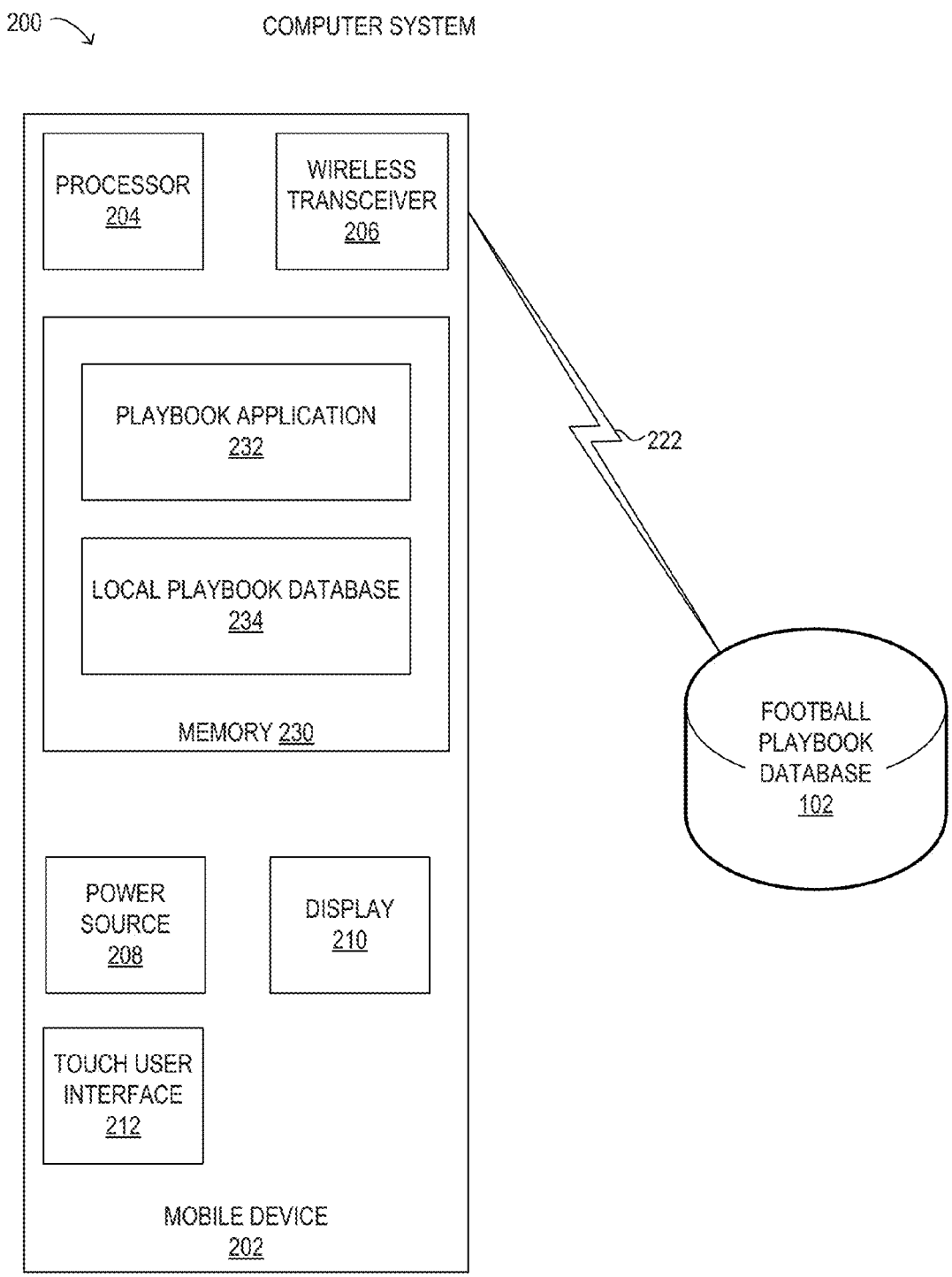
FIG. 2 illustrates a mobile device in communication with a playbook database.

Referring now to FIG. 2, a block diagram of selected elements of an embodiment of computer system 200 is depicted. In computer system 200, mobile device 202 may represent a tablet, a smart phone, or another suitable mobile device and may communicate with playbook database 102 (see FIG. 1) via communication link 222, which may be a wireless link. In other embodiments (not shown) mobile device 202 may be replaced by a computer system, such as a personal computer, that is either mobile or stationary. As will be described below, certain contents of playbook database 102 may be located on a remote server or locally to mobile device 202 and may include various types of data related to plays, as mentioned previously.

In FIG. 2, processor 204 may represent at least one processing unit and may further include internal memory, such as a cache for storing processor executable instructions. In various embodiments, processor 204 is operable to perform operations associated with electronic playbooks, as described herein. Processor 204 may access memory 230 to receive executable instructions and/or to store data in memory 230.

In FIG. 2, wireless transceiver 206 may represent a communications transceiver providing an interface for any of a number of communication links. In certain embodiments, wireless transceiver 206 supports wireless communication links, such as infrared (IR), radio frequency (RF), and audio, among others. Examples of RF wireless links include the IEEE 802.xx family, such as WiFi® (IEEE 802.11) and Bluetooth® (IEEE 802.15.1). In addition to wireless transceiver 206, playbook database 102 may further support mechanically connected communication links, such as galvanically wired connections, sensor interface connections, connections to external antennas, network connections (i.e., Ethernet), etc. Wireless transceiver 206 may transform an instruction received from processor 204 into a signal sent via communication link 222. It is noted that wireless transceiver 206 may be a bidirectional interface, such that responses, such as commands, information, or acknowledgements, may be received via communication link 222.

In FIG. 2, mobile device 202 may represent a tablet, a smart phone, or another suitable mobile device with application processing capacity. Mobile device 202 may be in the possession of a coach or other team official charged with planning and execution of plays in a football game. It is noted that an application executing on mobile device 202 may specifically be configured to operate with one or more instances of playbook database 102. Wireless transceiver 206 may further represent a client device in a wireless network (not shown) that is accessible via communication link 222. The wireless network may be a wide-area wireless network, such as a cellular telephony network, for example, and may enable mobile device 202 to communicate with playbook database 102 to exchange application data, commands, and data, as desired.

In FIG. 2, memory 230 encompasses persistent and volatile media, fixed and removable media, magnetic and semiconductor media, or a combination thereof. Memory 230 is operable to store instructions, data, or both. Memory 230 as shown includes data, which may be in the form of sets or sequences of executable instructions, namely, playbook application 232 and local playbook database 234. Playbook application 232 may include processor executable instructions to enable access to electronic plays, as described herein. Local playbook database 234 may represent a local cache of at least a portion of playbook database 102 that may enable mobile device 202 to operate partially or completely independently. For example, local playbook database 234 may enable a user to continue using playbook application 232 even when communication link 222 (or another network link) is unavailable, and may automatically synchronize with playbook database 102 when communication link 222 becomes available.

Also shown included with mobile device 202 in FIG. 2 is power source 208, which may represent a local power source, such as a battery and/or an interface to an external power supply. Power source 208 may be configured for DC, AC or both, and may be configured to convert between various levels of AC and/or DC power. Power source 208 may be configured to regulate an output voltage or an output current, as desired. Mobile device 202 is shown in FIG. 2 including display 210, which may be implemented as a liquid crystal display screen, a light-emitting diode (LED) screen, a computer monitor, a television or the like. Display 210 may comply with a display standard for the corresponding type of display. Standards for computer monitors include analog standards such as video graphics array (VGA), extended graphics array (XGA), etc., or digital standards such as digital visual interface (DVI), and high definition multimedia interface (HDMI), among others. A television display may comply with standards such as National Television System Committee (NTSC), Phase Alternating Line (PAL), or another suitable standard. In conjunction with display 210, touch user interface 212 may enable tactile input to content presented by display 210. In some embodiments, the user may choose a position that is an eligible receiver. The user may touch and drag their finger on touch user interface 212 as if to draw an image of a desired route for that receiver. Mobile device 202 may capture the touch-generated image and search playbook database 102 for a route most similar to the image drawn by the user. The user could draw an image for one eligible receiver or for a plurality of eligible receivers. Mobile device 202 may display all plays from playbook database 102 that matched the criteria provided by the user.

Figure 3:
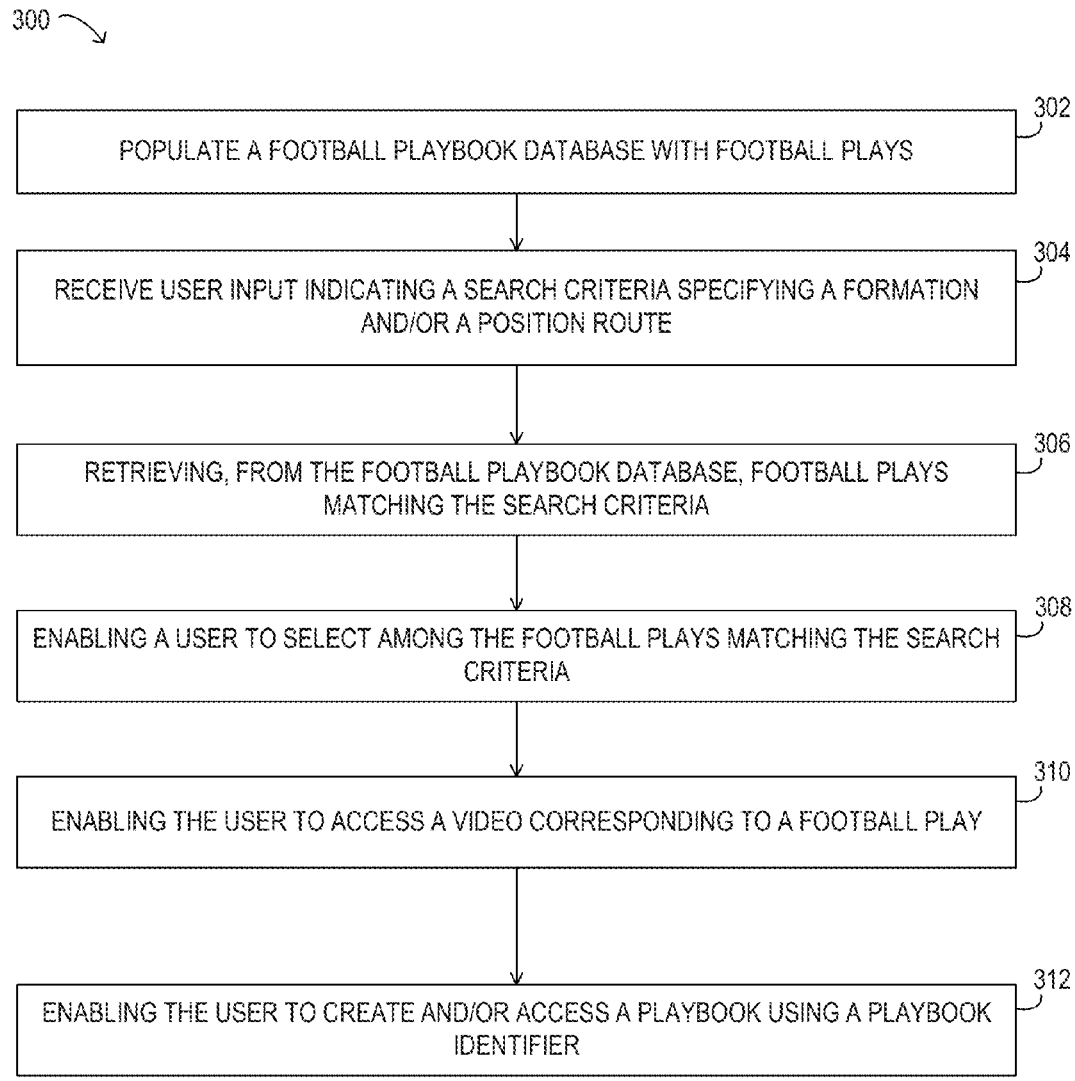
FIG. 3 illustrates a play selection method.

Turning now to FIG. 3, a block diagram of selected elements of an embodiment of method 300 for using an electronic playbook is depicted in flow-chart form. Method 300 may be performed using playbook database 102 and/or playbook application 232 (see FIGS. 1 and 2) in various embodiments. It is noted that certain operations described in method 300 may be optional or may be rearranged in different embodiments.

Method 300 may begin by populating (operation 302) a playbook database with plays. User input may be received (operation 304) indicating a search criteria specifying a formation and/or a position-route. Plays matching the search criteria may be retrieved (operation 306) from the playbook database. A user may be enabled (operation 308) to select among the plays matching the search criteria. The user may be enabled to access (operation 310) a video corresponding to a play. The user may be enabled to create and/or access (operation 312) a playbook using a playbook identifier. In the embodiment depicted in FIG. 3, two or more users may be able to share access to a common set of plays, i.e., a common playbook database or a common playbook created by one of the users. For example, an offensive coordinator may access the active playbook for a team's upcoming game and add an offensive play to the playbook. The offensive coordinator might then save the revised playbook back to the playbook database and make it or keep it accessible to the all coaches and players, coaches and players with a need to know, and so forth.

Figures 4A, 4B, 4C:
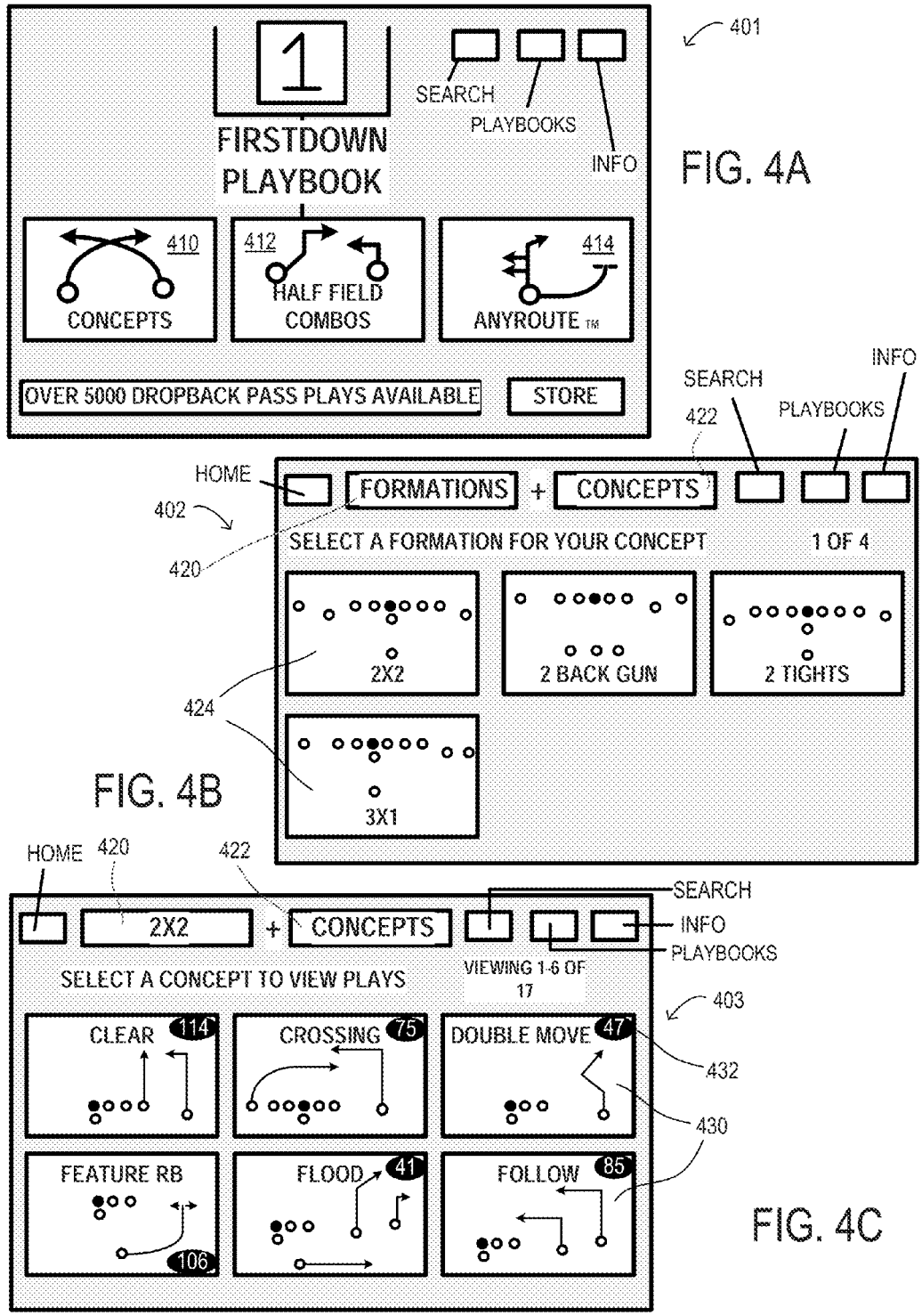
FIG. 4A, FIG. 4B, and FIG. 4C illustrate user interfaces for selecting one or more plays from an electronic database of plays.

Turning now to FIGS. 4A, 4B, and 4C, display screens depicting selected elements of an embodiment of football playbook application 232 (see FIG. 2) are depicted. In FIGS. 4A-C, various user interfaces for performing a search query using football playbook application 232 are depicted. In FIG. 4A, user interface 401 may be a launch screen for selecting "CONCEPTS", "HALF-FIELD COMBOS", and "ANYROUTE™", which correspond respectively to concept query 122, combination query 124, and route query 126, as discussed above with respect to FIG. 1. Specifically, button 410 may select "CONCEPTS", button 412 may select "HALF-FIELD COMBOS", and button 414 may select "ANYROUTE™". In FIG. 4B, after selecting button 410 for "CONCEPTS" in user interface 401 (see FIG. 4A), user interface 402 may appear showing formations 424 that are presented as various play images for selection. Also shown in user interface 402 are formation display 420, which may show a current state of a formation selection, as well as detail display 422, which may show another current selection. In FIG. 4C, after selecting a formation called "2×2" in FIG. 4B, various concepts corresponding to the formation are presented as diagrams or panels 430 showing play images for selection in user interface 403. As shown, panels 430 each include play number indicator 432 showing a number of available plays (i.e., plays in the database matching the selected search criteria) for each respective instance of panels 430. In user interface 403, formation display 420 shows "2×2" as the selected formation, while detail display 422 shows "CONCEPTS".

Figure 5A:
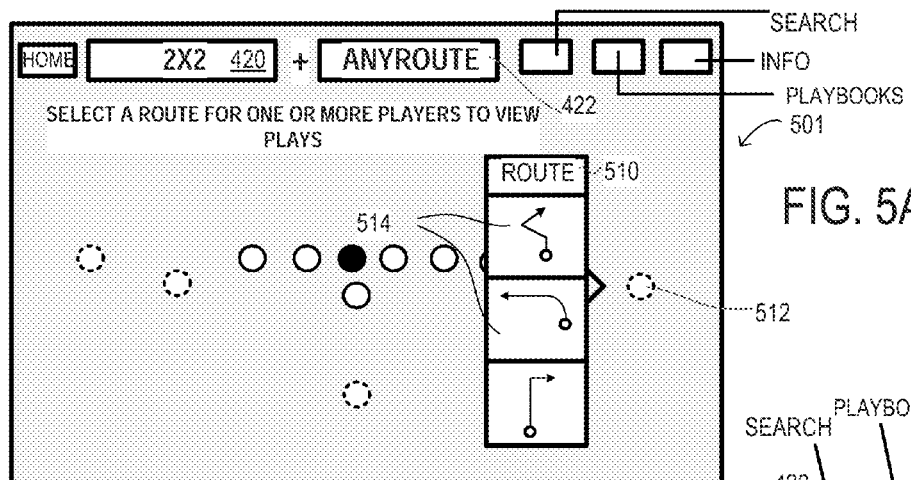
FIG. 5A, FIG. 5B, and FIG. 5C illustrate additional user interfaces for selecting one or more plays from an electronic database of plays.
Figure 5B:
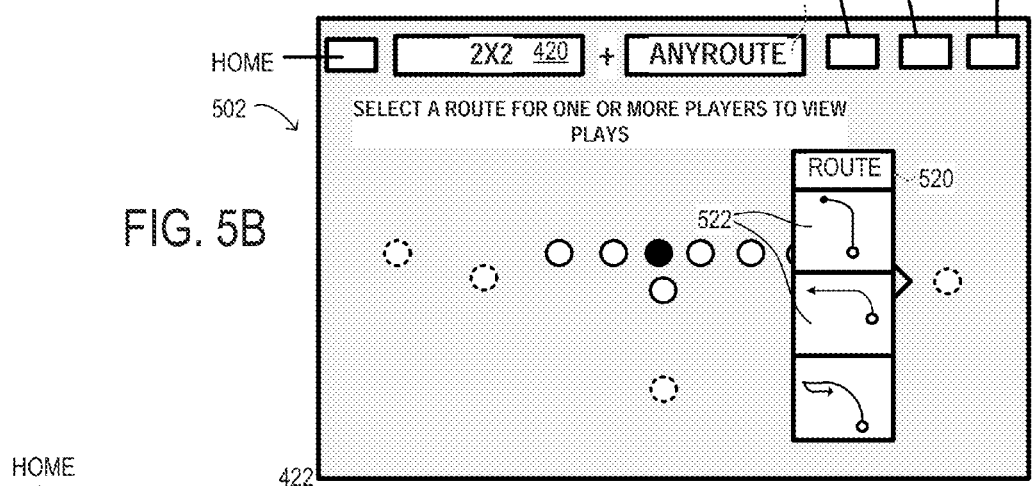
Figure 5C:
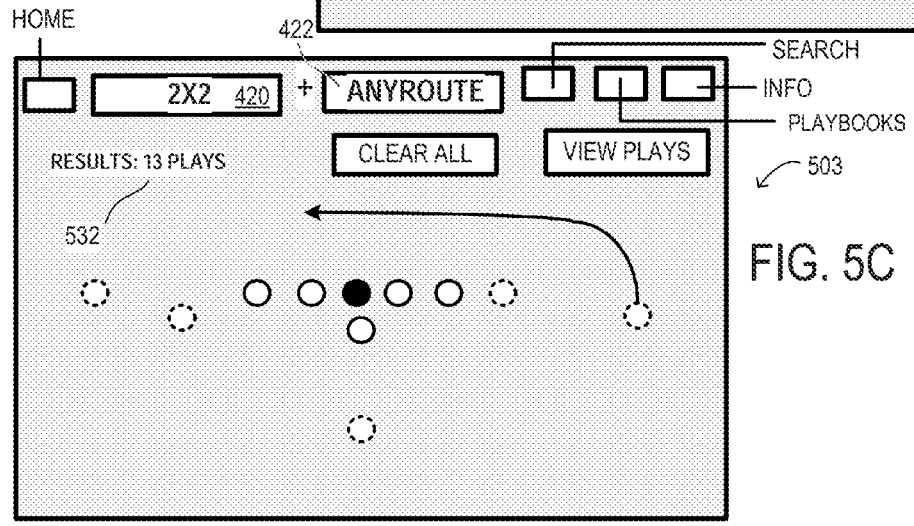

Turning now to FIGS. 5A, 5B, and 5C, display screens depicting selected elements of an embodiment of football playbook application 232 (see FIG. 2) are depicted. In FIGS. 5A-C, various user interfaces for selecting football plays retrieved using football playbook application 232 are depicted. The play images in FIG. 5A may represent families of similar plays that may be presented after selection of button 414 "ANYROUTE™" in user interface 402 (see FIG. 4A) and selection of a formation, which in user interface 501 is a "2×2" formation. Accordingly, in user interface 501, formation display 420 shows "2×2" while detail display 422 shows "ANYROUTE™". In FIG. 5A, user interface 501 may show tree 510 of plays that are presented as play images for selection. Specifically, tree 510 may include play images of route types 514 that may be selected. Additionally, a team position for restricting position-routes may be selected, which in panel 501 is a "Z" receiver shown by indicator 512.

In FIG. 5B, after selecting route type 514 corresponding to "2" from tree 510 in user interface 501 (see FIG. 5A), tree 520 in user interface 502 may show routes 522 corresponding to route type 514 selected previously. For example, tree 520 may show a number of plays corresponding to a set of "2" routes that "Z" can run from a "2×2" formation for browsing and/or selection. In user interface 502 formation display 420 shows "2×2" while detail display 422 shows "ANYROUTE™". In FIG. 5C, user interface 503 shows a selected play image representing the selected play from user interface 502 (see FIG. 5B). In response to a user selecting "2 drag" from routes 522 (see FIG. 5B), a first of 13 plays satisfying the previously selected criteria for formation, position, and route is shown in user interface 503, which includes indicator 532 showing the number of available plays. In user interface 503 formation display 420 shows "2×2" while detail display 422 shows "ANYROUTE™". While not depicted, the user can then browse through the set of 13 plays that satisfy the "ANYROUTE™" criteria, viewing each individual play as desired.

Turning now to FIGS. 6A, 6B, and 6C, display screens depicting selected elements of an embodiment of football playbook application 232 (see FIG. 2) are depicted. In FIGS. 6A-C, various user interfaces for selecting football plays retrieved using football playbook application 232 are depicted. In FIG. 6A, user interface 601 shows play families corresponding to search criteria presented as play images for selection. In FIG. 6A, user interface 601 may show panels 610 representing combinations that are available for selection after choosing button 412 ("HALF-FIELD COMBOS", see FIG. 4A) and selecting "2×2" from formations 424 in user interface 402 (see FIG. 4B). Accordingly, in user interface 601 formation display 420 shows "2×2" while detail display 422 shows "COMBOS". In user interface 601, each panel 610 may include indicator 612 showing a number of plays available for an individual combination. In user interface 601, play images in panels 610 may represent families of similar plays that may be presented for selection.

In FIG. 6B, user interface 602 shows panels 620 of individual plays presented after selection of a combination in user interface 601 (see FIG. 6A). In user interface 602, after selecting "16" from panels 610 (see FIG. 6A), panels 620 of play images of individual plays corresponding to a set of "16" combinations for a "2×2" formation are shown for browsing and/or selection. Accordingly, in user interface 602, formation display 420 shows "2×2" while detail display 422 shows "16". In FIG. 6C, user interface 603 shows play image 630 representing a selected play from panels 620. In response to a user selecting "116 F CORNER H POP" from panel 602 (see FIG. 6B), play image 630 of the selected play is displayed in user interface 603. In user interface 603, formation display 420 shows "2×2" while detail display 422 shows "16". It is noted that the user may rename (not shown) the play represented by the play image in FIG. 6C and may create (not shown) a playbook including the play, add (not shown) the play to an existing playbook, and rename (not shown) a playbook.

Figure 7:
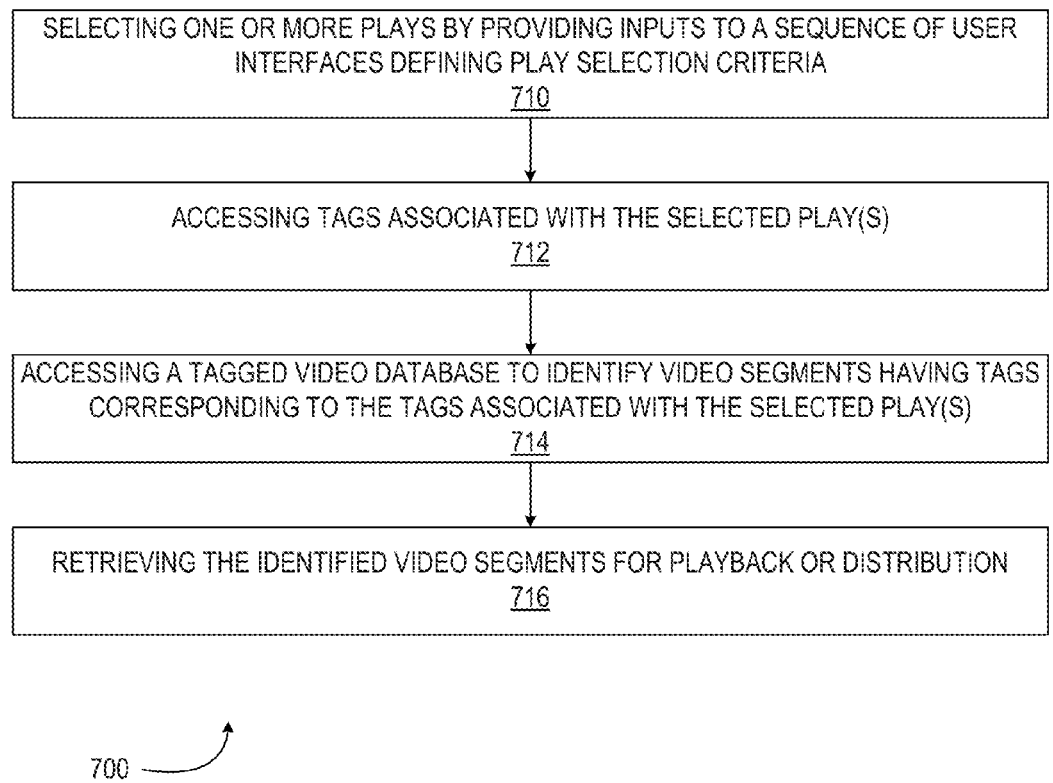
FIG. 7 illustrates a play selection method emphasizing a feature targeted for coaches and players.

Now turning to FIG. 7, selected elements of an embodiment of method 700 for selecting one or more plays from an electronic database of plays are illustrated. In some embodiments, method 700 is employed to identify portions of football video that is of interest to a coach or player in assessing any tendencies, strengths, and weaknesses of the team or its opponents. Reviewing large quantities of video in preparation for an upcoming game, generally referred to as film study, is common practice in modern professional, collegiate, and high school football. The illustrated embodiment of method 700 includes selecting (operation 710) plays by providing inputs to a sequence of user interfaces defining play selection criteria. In some embodiments, the sequence of user interfaces defines plays with increasing specificity. For example, the user interfaces presented to the user may include a first interface that identifies a phase of the game, e.g., offense, defense, and kicking, while a later user interface may define the specific patterns or routes that eligible receivers take in the case of an offensive pass play.

After identifying one or more plays of interest, some embodiments of method 700 may then access (operation 712) tags associated with the selected play(s). The tags may identify individual plays according to a predetermined scheme or naming convention. For example, any given play may be tagged with a name uniquely identifying the play. The tag may, in another embodiment, include a concatenation or combination of the selection criteria used to identify the play. In still other embodiments, the tag may include a numerical value uniquely identifying the play. The tag may include a vector or combination of tag parts including tags for different characteristics of the play. For example, if the selected play is a pass play, a tag for the selected play may include a phase component having a value associated with a pass play.

The depicted embodiment of method 700 further includes accessing (operation 714) a tagged video database to identify video segments having tags corresponding to the tags associated with the selected play(s). In some embodiments, large quantities of video have been previously viewed and tagged. In some embodiments, the tagging of video may include the use of a play identification application that functions in a manner analogous to the play selection applications disclosed herein except that the user interfaces presented to the user are used to assign a video segment to a particular play and to tag the video segment accordingly. In some embodiments, the tagging of the video may be performed apart from the operations of method 700. In some embodiments, the video database is maintained separately from the playbook database and the tagging of video may be performed by a different user or entity than the coach, player, or other entity using method 700. While a video database, pre-tagged by a third party, may be a common implementation, other implementations may include video tagging as a step or operation of method 700. The depicted embodiment of method 700 further includes retrieving (operation 716) the identified video segments for playback or distribution. Retrieving video segments may include generating a list of video segments identified in operation 714.

Figure 8A:
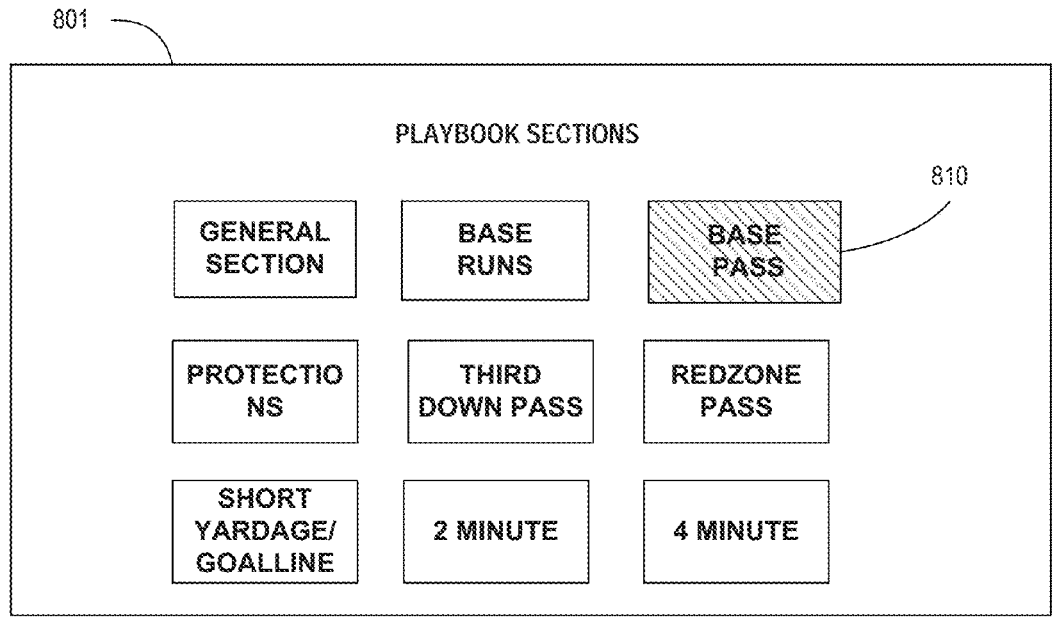
FIG. 8A and FIG. 8B illustrate play selection user interfaces suitable for use with the method illustrated in FIG. 7.
Figure 8B:
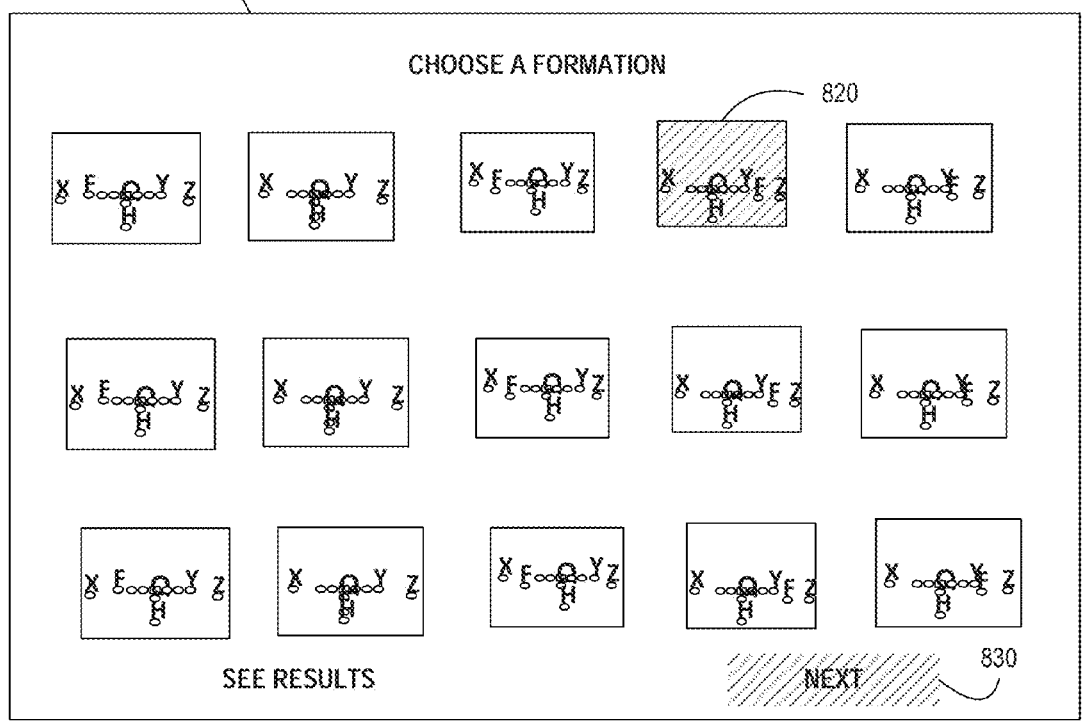

Turning now to FIG. 8A and FIG. 8B, display screens illustrating selected user interfaces of an embodiment of football playbook application 232 (see FIG. 2) are depicted. The user interfaces illustrated in FIG. 8A and FIG. 8B are exemplary of user interfaces used by coaches or players for selecting football plays. While the user interfaces illustrated in FIG. 8A and FIG. 8B emphasize offense, football playbook application 232 encompasses user interfaces for defense and special teams as well.

FIG. 8A illustrates a playbook section user interface 801 as one of a series of user interfaces presented to a user to select one or more plays. In some embodiments, each user interface corresponds to a play selection parameter and the user input provided in response indicates the value of the play selection parameter. The illustrated user interface 801 offers the user a choice of nine values for the playbook section parameter. The playbook section parameter classifies plays according to various situations in which the applicable plays might be most suitable. Selecting the short yardage option, for example, accesses plays that might be chosen when the offense needs two or less yards to cross the opponent's goal line or make a first down. The other playbook section options apply to other portions of the interface.

When the user indicates a selection from the user interface, the selection may be temporarily highlighted as the application advances to the next user interface. In FIG. 8A, a user has selected the "base pass" option 810, as suggested by the highlighting of the applicable option icon. While FIG. 8A depicts a "base pass" game parameter as being selected, any of the playbook section interface parameters may be selected.

FIG. 8B illustrates user interface 802 corresponding to a formation parameter. The illustrated user interface 802 includes 15 icons corresponding to 15 different formations that a user is able to select. In at least one embodiment, the formation parameter user interface 802 is presented following the selection of an icon from the preceding user interface. As illustrated in FIG. 8A and FIG. 8B, for example, user interface 802 may be presented to the user following the user's selection of a playbook section icon from user interface 801. In addition, the formation user interface 802 illustrates the base formation of the set of plays that satisfy the playbook section criteria. As illustrated in FIGS. 8A and 8B, for example, the formation icons that populate formation user interface 802 include the formations of plays that are encompassed within the base pass plays selected with respect to playbook section 801. In some embodiments, the play selection process proceeds in this manner, with the application presenting user interfaces corresponding to each playbook database parameter and the user indicating a selection from the one or more available options to narrow the number of plays to one or more plays that satisfy all of the selected options. The FIG. 8B illustration is of user interface 802 with a particular formation 820 selected. The user interface 802 illustrated in FIG. 8B includes a "next" icon 830 that, when selected or otherwise indicated by the user, proceeds to the next user interface.

Figure 9A:
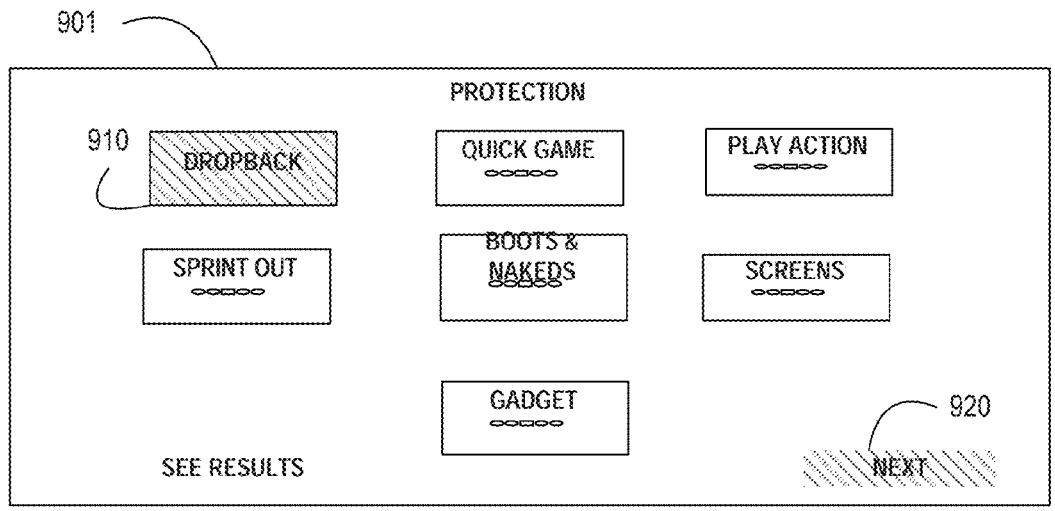
FIG. 9A, FIG. 9B, and FIG. 9C illustrate additional play selection user interfaces suitable for use with the method illustrated in FIG. 7.
Figure 9B:
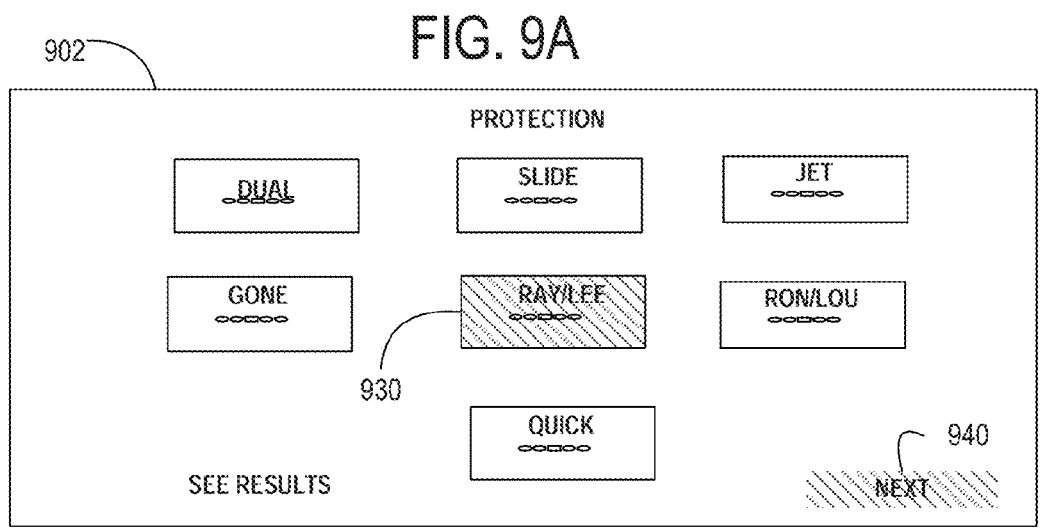

FIG. 9A and FIG. 9B illustrate exemplary user interfaces 901 and 902 for a "protection" parameter to illustrate an example in which the number of options for a play selection parameter is presented over multiple user interfaces. In this case, the "next" icon 920 on user interface 901 transitions the user from a first "protection" user interface 901 to a second "protection" user interface 902. The protection parameter further classifies plays according to a particular one of several available protection options. User interface 901 is illustrated in FIG. 9A with a "dropback" option 910 and a next icon 920 selected. User interface 902 is then illustrated in FIG. 9B with a "Ray/Lee" option 930 and an next icon 940 selected. In this case, the "next" icon 940 on user interface 902 transitions the user from a second "protection" user interface 902 to a "concept" play selection parameter user interface 903.

Figure 9C:
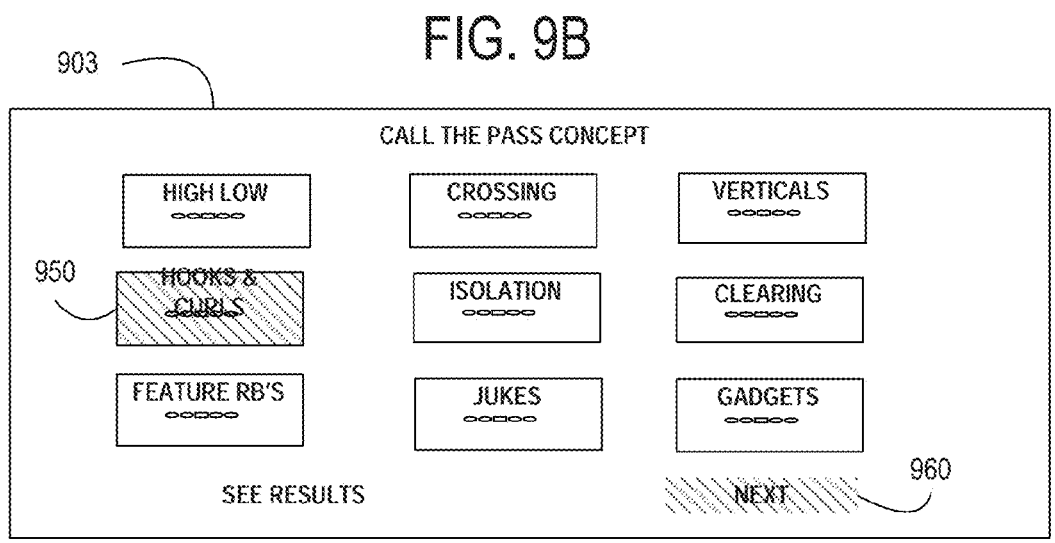

FIG. 9C illustrates a user interface 903 corresponding to a "concept" play selection parameter where the concept refers to one of several available choices for combinations of routes executed by a combination of two or more eligible receivers. User interface 903 is illustrated in FIG. 9C with a "hook and curl" option 950 and a next icon 960 selected.

Figure 10A:
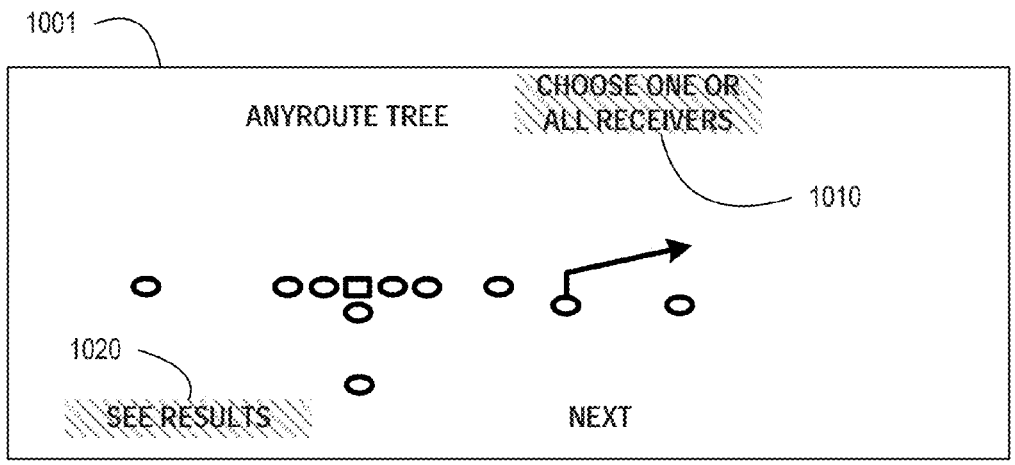
FIG. 10A, FIG. 10B, and FIG. 10C illustrate additional play selection user interfaces suitable for use with the method illustrated in FIG. 7.

FIG. 10A illustrates an "any route" user interface 1001 through which the user can select one or more plays by indicating the specific routes of one or more eligible receivers. An exemplary implementation of the any route user interface 1001 may include all or substantially all of the features described above with respect to FIG. 5A, FIG. 5B, and FIG. 5C. The user interface 1001 illustrated in FIG. 10A includes a button or control 1010 to choose patterns for one or more eligible receivers and a results button or control 1020 to view the plays associated with a user's any route selections.

Figure 10B:
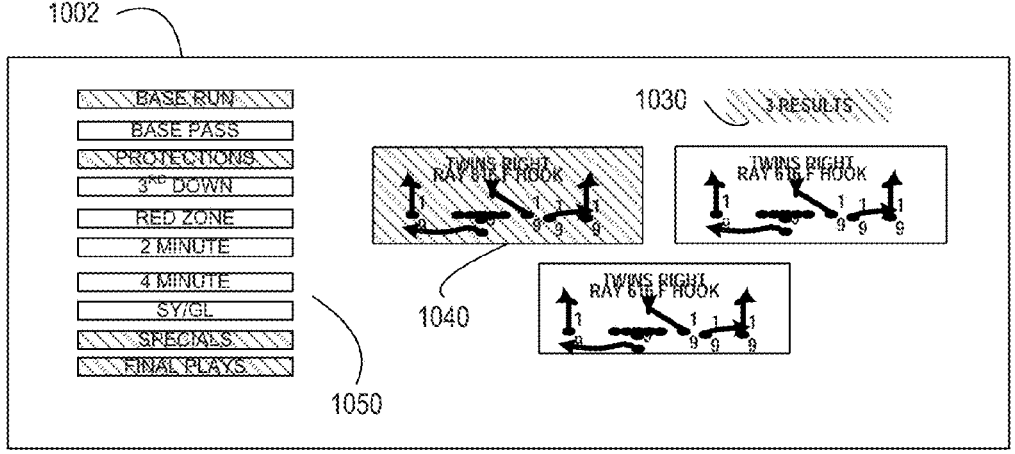

FIG. 10B illustrates user interface 1002 depicting results obtained in response to the user inputs provided with the user interfaces depicted in FIG. 8A, FIG. 8B, FIG. 8C, FIG. 9A, FIG. 9B, FIG. 9C, and FIG. 10A as described previously. The user interface 1002 illustrated in FIG. 10B includes an indication 1030 of the number of plays that match the selection criteria corresponding to the previously provided user inputs. The user interface 1002 illustrated in FIG. 10B also includes a depiction 1040 of the one or more plays that the selection criteria identified. In some embodiments, the result might include multiple plays having very small differences between or among them. In these embodiments, depicting highly similar plays as part of a multiple play result may be preferable to requiring the user to input every last detail regarding the play under consideration. For example, if two or more plays have substantially the same formation and other parameters, but may have a slightly different pre-snap motion, all such plays might be included in a result rather than requiring the user to identify the pre-snap motion as part of the selection process. Although the depiction 1040 of the three plays in FIG. 10B depicts three instances of the same play, the drawing is illustrative of the concept and, generally, multiple plays presented in user interface 1002 will include perceptible, if small, differences. The user interface 1002 illustrated in FIG. 10B also includes a summary indication of the user's selections 1050.

Figure 10C:
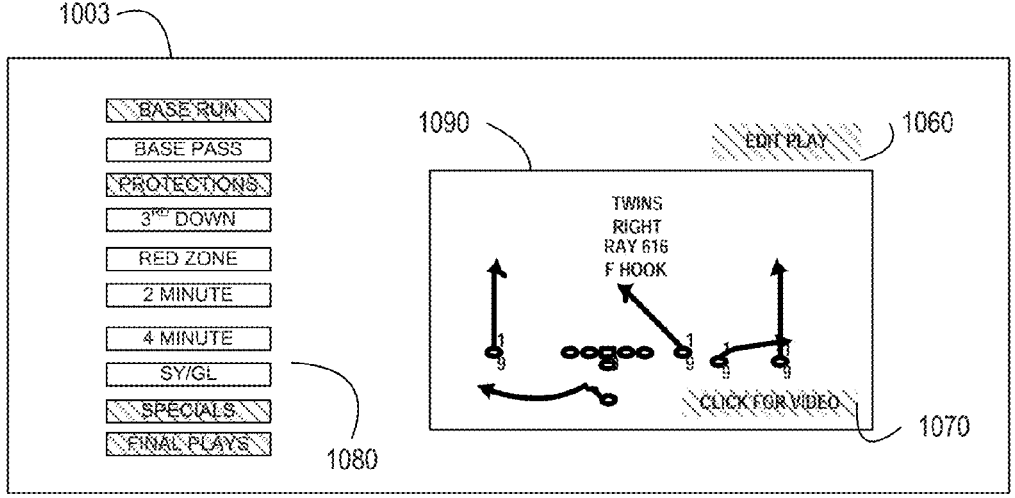

FIG. 10C illustrates a final selection user interface 1003 generated in response to user input provided to user interface 1002. Referring back to FIG. 10B, the individual play selected by the user is indicated with hashing in the summary indication of the user's selections 1080 and it is this play 1090 that is illustrated in user interface 1003 of FIG. 10C. The user interface 1003 depicted in FIG. 10C also includes an edit play option 1060 and a click for video option 1070. User selection of the edit play option 1060 transitions the user to a new search or to another home page depending upon the implementation. Click for video option 1070 may be implemented in conjunction with the tagging of video described previously such that selection of the option will upload or otherwise access portions of a video database that have been tagged with information sufficient to identify the video as being relevant to the same play that the user selected through the application. Click for video option 1070 might, for example, open a video presentation application and initiate a database query sufficient to identifying portions of the video matching the selected play or plays. Depending upon the implementation, access to the video may be protected with a logon or other form of user authorization mechanism and the video may be presented thorough a different application or through a different display device.

Figure 11:
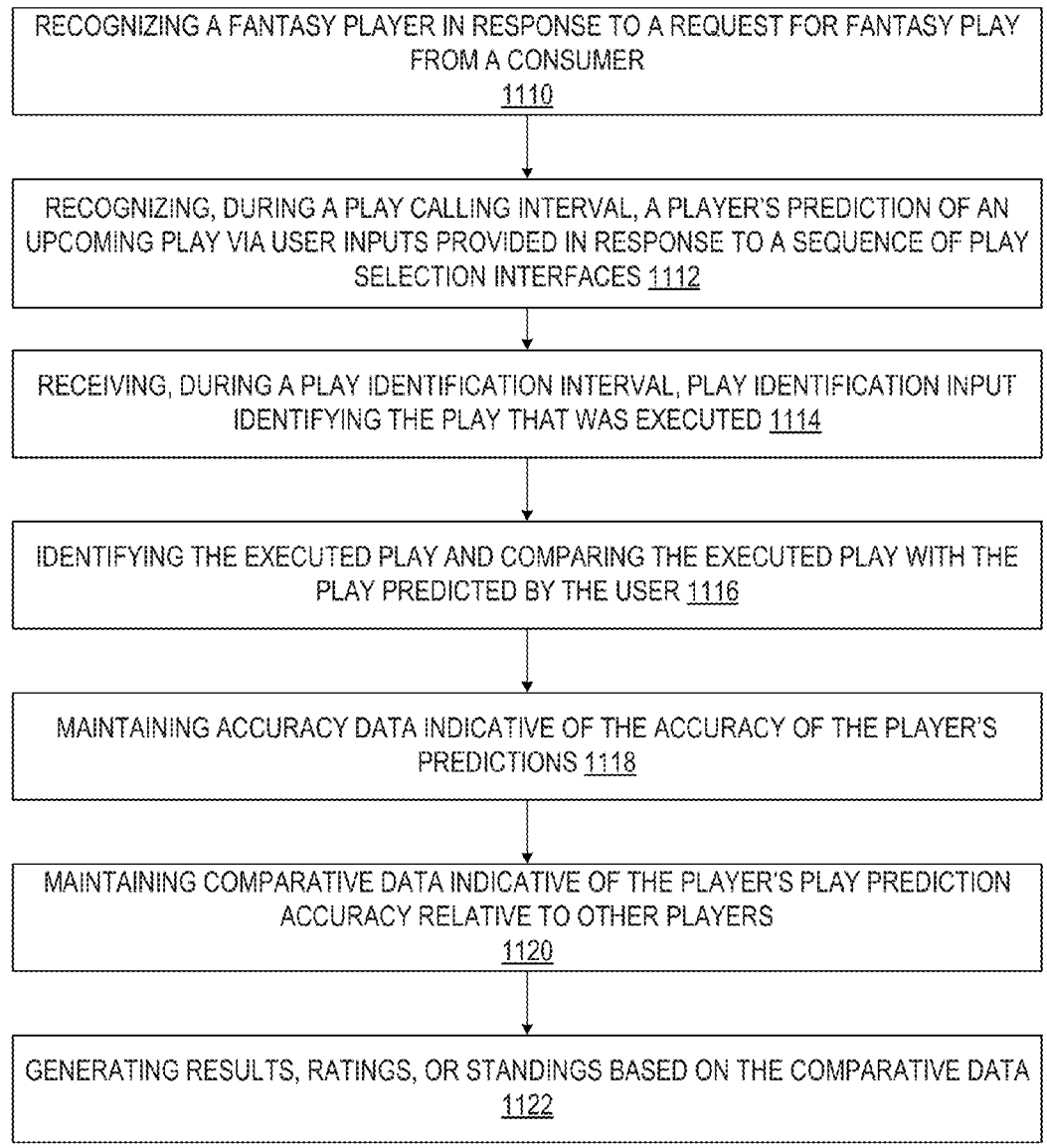
FIG. 11 illustrates a play selection method emphasizing vicarious coaching features targeted for consumers and home users.

Now turning to FIG. 11, a method 1100 of implementing a vicarious or fantasy football competition is illustrated. In some embodiments, method 1100 invokes or leverages the play selection functionality described previously and extends and streamlines the play selection process to accommodate users, including casual observers as well as more dedicated fans, who may lack the extensive expertise and preparation that coaches and players have, but nevertheless possess a desire to become more involved with the game. In at least one embodiment, users call upcoming plays by making intuitive choices via one or more user interfaces that illustrate plays visually, thus enabling users to make meaningful and intuitive play selection choices even if they do not possess an extensive football vocabulary. In at least one embodiment, the user interfaces that are provided to the user are optimized or customized for the specific team that is playing based on the team's previous performance and play calling history. In at least one embodiment, user interfaces are optimized for specific teams through a statistical analysis of the team's play calling history. For example, the user interfaces for a team that never or rarely executes plays from a specific formation, e.g., shotgun formation, may omit shotgun formations from a formation selection user interface whereas a team that frequently runs plays from the shotgun formation may include one or more shotgun formations as part of a formation selection user interface.

Many fantasy sports organizations and services distinguish success or failure of the teams involved in actual competition and the success or failure of a player. For example, fantasy football and baseball leagues and services are often based on fantasy teams having rosters that are independent of the rosters of the teams from which players are drawn. This leads to a potentially undesirable consequence that participation in a fantasy league actually lessens the fantasy player's dedication to a particular team. If, for example, a fantasy football player has drafted the quarterback from a team who is playing the team the fantasy player has selected as its defense, the fantasy player has an inherent conflict of interest in terms of who the player supports. Moreover, if the fantasy player, by design or otherwise, drafts no players from a team that the player would generally identify as his or her favored or preferred team, the fantasy player's allegiance to the team may be unintentionally diminished while favoring only or primarily those players and teams that benefit the fantasy player's standing in the league or service. The method 1100 illustrated in FIG. 11 encompasses embodiments that can align the user's interests more closely with the user's team of choice. In addition, whereas many vicarious coaching applications and services require pre-game preparation through the use of weekly or periodic drafts and other activities, embodiments of the illustrated method offer the consumer the opportunity to participate with little or no prior preparation.

As suggested in the preceding paragraphs, method 1100 may access or otherwise leverage the play selection technology described above with respect to playbook database 102 and/or playbook application 232 (see, e.g., FIG. 1 and FIG. 2). In some implementations, method 1100 includes operations performed by a Web server or other network accessible application server as the server executes processor executable program instructions stored in a memory or other computer readable storage of, or accessible to, the server.

In FIG. 11, the operations of method 1100 include recognizing (operation 1110) a fantasy player in response to a request for fantasy play from a user. Generally, method 1100 will be applicable to a large audience of potential users including, as an example, those attending the game or watching a broadcast of the game from home or elsewhere. In some embodiments, users access one or more application servers performing method 1100 through a Web browser or a dedicated Web application. In the case of a dedicated Web application, the application may be implemented as part of a football playbook application 232 (FIG. 2) stored in a memory 230 of a user's mobile device 202 or other computer system and executed by a processor 204. Regardless of whether the consumer accesses the application server from a general purpose Web browser or a dedicated application, the application server may present the user via various interfaces and including various links or other selectable objects for providing user input. A user interface may, for example, include a "join game" object enabling the user to submit a request to join a game. Joining a game may include identifying a particular football game being played as well as identifying a group of users against whom the user wants to compete. The group of users may be a group defined by the users themselves including, as an example, a group of users that are organized as a league or other subset of users defining a group of users within which rankings, standings, or another form of comparative scores are determined.

After a user's request to be recognized is processed, the method 1100 illustrated in FIG. 11 includes a sequence that is repeated throughout the game involving a play call, by the one or more users, regarding an upcoming play, usually the next play, a determination or identification of the play executed on the field after it is executed, and a comparison between the play called by the user and the play executed on the field. The comparison determines similarity between the played called by the user and the play executed on the field, i.e., the extent to which the play called by the user matches the play executed on the field. Similarity data for each of one or more plays may be accumulated and used, either exclusively or in combination with one or more other parameters including, without limitation, a success parameter indicative of whether the play identified was a successful play according to a success criteria, algorithm, or rule, to score or rank the various users in a league or other group of users.

Method 1100 as illustrated in FIG. 11 implements the basic sequence described in the preceding paragraph with server application operations that recognize (operation 1112), during a play calling interval, a vicarious coaching player's call for an upcoming play via user inputs to a sequence of play selection user interfaces equivalent to or analogous to the series or sequence of user interfaces described above with respect to FIG. 4 through FIG. 6 and FIG. 8 through FIG. 10. The play calling interval during which a vicarious coaching player's play calls are recognized may coincide with the interval between the end of the previous play, usually signaled by a referee's whistle and the beginning of the next play, usually initiated by the next snap of the football by the center. After a play is selected by the vicarious coaching player, a play is executed on the field.

The method 1100 illustrated in FIG. 11 includes receiving (operation 1114), during a play identification interval, play identification input that identifies or that may be used to identify the play that was executed. The play identification input may indicate a spotter's input to a sequence of play identification interfaces. In at least one embodiment, the play selection user interfaces provided to the vicarious coach and the play identification interfaces provided to a spotter may be the same or substantially similar set of user interfaces.

The play selection user interfaces provided as part of a vicarious coaching application may be streamlined or otherwise simplified with respect to play selection user interfaces provided to coaches and players as described previously. For example, whereas the play selection user interfaces provided to coaches and players may include substantially every play in a playbook database and may require the user to provide input to a relatively large number of play selection user interfaces some or all of which may require advanced knowledge of football terminology and techniques, the vicarious coaching application may employ an edited subset of the available plays and may require the user to provide inputs to fewer and simpler play selection user interfaces.

Method 1100 may include, as illustrated in FIG. 11, identifying plays after they are executed and comparing the identified plays with the plays called by the users (operation 1116). Identification of executed plays may be implemented with persons, known as "spotters", knowledgeable in football who are present during the game or who watch the game remotely via television or otherwise and who are equipped with communication capability enabling them to com. In this approach, one or more spotters skilled in the identification of football plays may use play selection applications described herein to identify the play. While a play is executing or after the play is executed, a spotter may provide inputs to a sequence of play selection user interfaces that may be the same as or similar to the play selection user interfaces displayed to the user, to identify an executed play. The identified play would then become the play against which plays called by the users are compared. In another embodiment, one or more stationary or movable cameras positioned above the field of play may be used to monitor the initial formation of the players on the field before a play begins as well as the motion paths of the various players as the play is executed. The images provided by these one or more cameras may be analyzed with pattern recognition techniques to identify a match between the executed play and a play from the playbook database. In still another embodiment, one or more players on the field may be equipped with electronic transmitting devices that convey the position of the player(s) during a play. The information provided by these transmitting devices may be detected and processed by a receiver and analyzed by a suitable application to determine a match between the executed play and a play in the playbook.

The method 1100 illustrated in FIG. 11 further includes maintaining (operation 1118) similarity data indicative of similarity between the vicarious coach's play calls and the plays executed on the field and maintaining (operation 1120) comparative data indicative of the player's play calling similarity relative to other players. Results, ratings, or standings may then be generated (operation 1122) based on the comparative data. Various alternatives to the method illustrated may be included. For example, whereas FIG. 11 illustrates a vicarious coaching application that relies on a single metric to score or otherwise rank a vicarious player's selection of the upcoming play, other embodiments including embodiments described below with respect to FIG. 16 through FIG. 24, may valuate a vicarious player's performance based on a combination of similarity and success, where similarity refers to similarity between the play selected by the vicarious coach and the identified play and success refers to data indicative of whether the play executed on the file was a success. In this context, success may be determined based on how effective the identified play was in terms of scoring points, making first downs, maintaining possession of the football, conserving or consuming time on the game clock, or any other suitable objective. The success or failure of a play may be based on the yardage gained by the play in combination with the down-and-distance associated with the play. Whereas a single-factor vicarious coaching application, in which the vicarious coach is evaluated based solely on similarity, only emphasizes the vicarious coach's ability to predict what play the actual coach of the applicable team will call in any given situation, without regard to the vicarious coach's assessment of how successful the predicted play is likely to be, an application that scores vicarious coaches based, not only on similarity, but also success, permits and encourages the vicarious coach to call a play based solely on what the vicarious coach believes to be the play with the best chance of success.

Referring now to FIG. 12A through FIG. 13C, a sequence of play selection user interfaces depicts an exemplary implementation of a vicarious coaching application suitable for use in conjunction with a vicarious coaching process of the type illustrated in FIG. 11. Although FIG. 12A through FIG. 13C depict a specific number and sequence of play selection user interface, other implementations may include fewer, more, or different user interfaces.

Figure 12A:
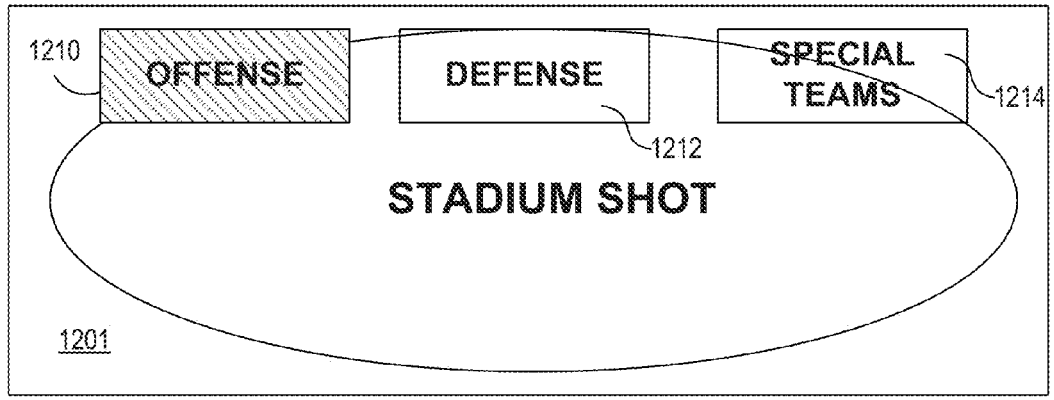
FIG. 12A, FIG. 12B, and FIG. 12C illustrate play selection user interfaces suitable for use with the method illustrated in FIG. 11.

Referring to FIG. 12A, a first play selection user interface 1201 prompts a vicarious coach to select from an offense icon 1210, a defense icon 1212, or a special team plays icon 1214 by clicking, tapping, or otherwise selecting the applicable icon. The OFFENSE icon 1210 is highlighted in in FIG. 12A to indicate that the vicarious coach elected to call plays for the team on offense.

In some embodiments, user interface 1201 may be omitted. For example, in some embodiments, the user may declare or associate with one of the two teams that are playing a particular game. When the user's declared team is on offense, the vicarious coaching application may automatically determine that the team is on offense, e.g., through information provided from the game by a spotter or other mechanism, and automatically provide the user with offensive plays while the user's declared team is in possession of the ball. Similarly, down-and-distance information and play clock information may be provided to a server and the server may be programmed to automatically provide the user with the option of selecting a special teams play on fourth down plays or when there is little or no time left on the play clock before halftime or at the end of game. In some embodiments that do not present the vicarious coaching player with first play selection user interface 1201, the vicarious coaching application may provide support only for offense.

Figure 12B:
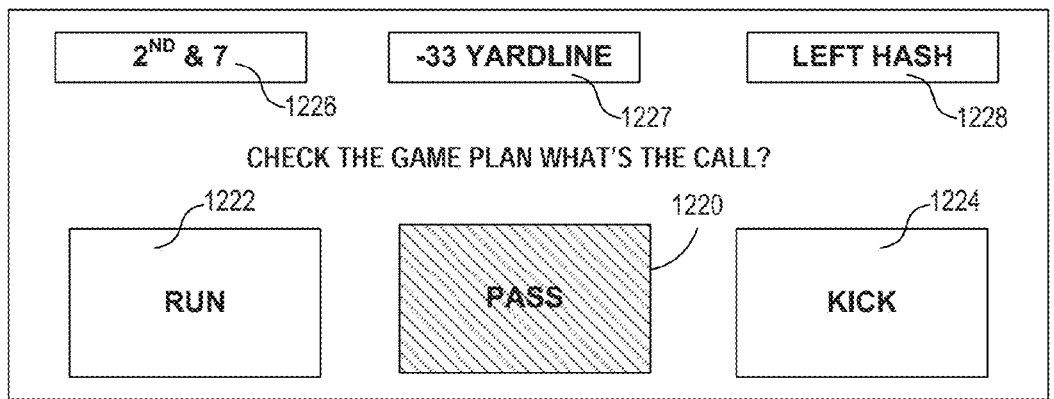

FIG. 12B illustrates a play-type user interface 1202 generated when the vicarious coaching player indicates offense in response to first user interface 1201 or generated as the first play selection user interface when play selection user interface 1201 is omitted. The play-type user interface 1202 includes a run icon 1222, a pass icon 1220, and a kick icon 1224 and prompts the vicarious coach to select the icon corresponding to the type of play the player wants to call. The pass icon 1220 is illustrated in FIG. 12B with highlighting to indicate that the vicarious coach is calling a pass play. The user interface 1202 illustrated in FIG. 12B also includes informational data including a down-and-distance indicator 1226, a yard line indicator 1227 indicating the line-of-scrimmage, and a hash mark indicator 1228 to indicate where along the line-of-scrimmage the ball will be snapped from.

Figure 12C:
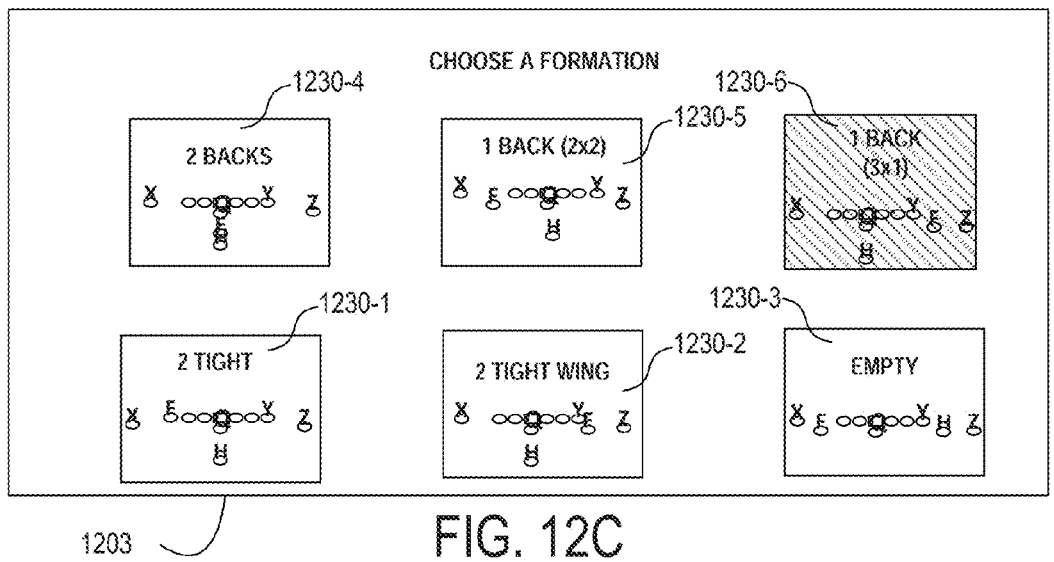

FIG. 12C illustrates a formation user interface 1203 generated in response to user selection of pass icon 1220 from play-type user interface 1202. Formation interface 1203 as illustrated in FIG. 12C prompts the vicarious coach to select one of a number of play formations represented by individual icons 1230-1 through 1230-6 as shown. In some embodiments, the formation interface 1203 presents the vicarious coach with a subset of all pass play formations to keep the application manageable and easy to use. For example, the play formation icons 1230-1 through 1230-6 illustrated in FIG. 12C may be selected by the play selection server based on historical play selection data in view of various factors including, as non-limiting examples, the team that has the ball, the down-and-distance, the score of the game, and other suitable factors, or a combination thereof. Thus, for example, the formations 1230-1 and 1230-6 presented to the vicarious coach in FIG. 12C may represent the six most frequently used pass play formation used by the applicable team, the six most frequently used pass play formation of the applicable team in second and long (see FIG. 12B down-and-distance indicator 1226) situations, and so forth. Similarly, the play formations 1230-1 through 1230-6 presented in user interface 1203 may be filtered based on the players on the field. If, for example, the team on offense alternates between two quarterbacks and one of the two quarterbacks historically tends to run the ball or hand off the ball more frequently than the other quarterback used by the team, the play formations 1230-1 through 1230-6 presented in formation user interface 1203 may change if the play selection server receives information indicating which quarterback will execute the next play. Similarly, the formations 1230 presented in formation user interface 1203 may be influenced by the game clock, the score of the game, and so forth. In some embodiments, the formation selection interface 1203 includes the fewest number of formations possible to cover a particular percentage of the formations used by the applicable team historically under similar game circumstances. For example, the formation user interface 1203 might include the fewest number of formations 1230 required to account for 80% of all plays executed by the applicable team in similar game circumstances, i.e., similar down, distance, time on clock, score, and the like. Thus, whereas a play selection application optimized for a coach or player preparing or studying a game plan may present the player or coach with a large number of formations, the formation interface 1203 illustrated in FIG. 12C is optimized for the home/consumer user in a vicarious coaching application or the like. User interface 1203 is illustrated in FIG. 12C with a "1 Back (3×1)" formation icon 1230-6 selected.

Figure 13A:
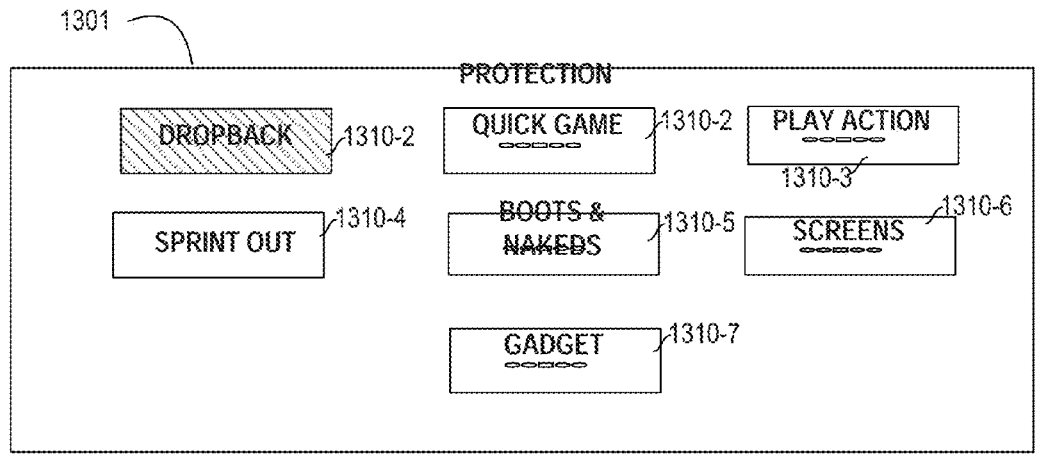
FIG. 13A, FIG. 13B, and FIG. 13C illustrate additional play selection user interfaces suitable for use with the method illustrated in FIG. 11.
Figure 13B:
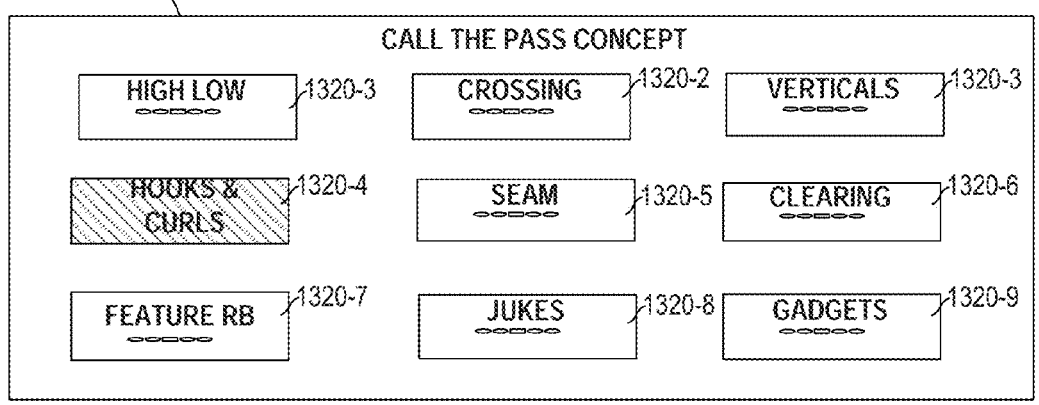
Figure 13C:
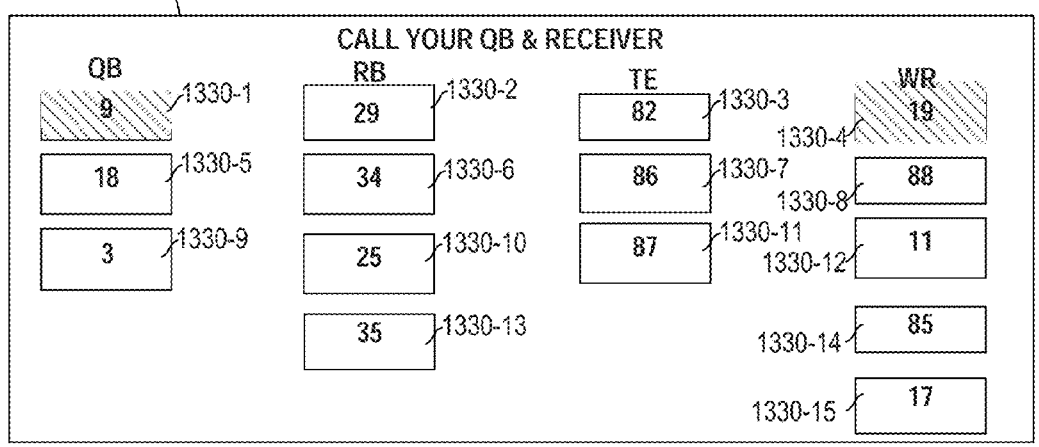

Turning now to FIGS. 13A, 13B, and 13C, additional user interfaces 1301, 1302, and 1303 are illustrated. User interface 1301 illustrated in FIG. 13A prompts the vicarious coach to select a protection scheme for the upcoming play. The selectable icons 1310-1 through 1310-7 presented in the user interface 1301 illustrated in FIG. 13A may represent a subset of all protections that the applicable team may employ out of a given formation. Again, the subset of protections presented to the vicarious coach may include the protections most frequently used by the applicable team in similar game circumstances. The protection user interface 1301 illustrated in FIG. 13A indicates a drop back protection icon 1310-1 as being highlighted to indicate that the vicarious coach selected this icon as the protection scheme for the upcoming play.

In some embodiments, one or more of the user interfaces illustrated may be omitted from the play selection to streamline and simplify the play selection process. Moreover, determining which particular set of user interfaces to present to the vicarious coaching application and which user interfaces to exclude from the play selection process may, itself, be a user selectable option (not depicted), either statically or dynamically. In some embodiments, certain application settings may be determined by an administrator of the group of users that participate in a common league. For example, a user may be designated as a commissioner of a particular league and the commissioner may have access and authorization to change settings controlling predetermined aspects of the play selection application. In these embodiments, the league commissioner may control, as examples, the number of user interfaces provided to a user on offense, the number of user interfaces provided to a user on defense, and so forth. Similarly, the league commissioner may have control of the maximum and/or minimum number of icons presented to a user with any given interface.

FIG. 13B illustrates a pass concept user interface 1302 prompting the vicarious coach to select a pass concept after selecting a particular protection scheme in user interface 1310. For example, because the vicarious coach selected drop back interface 1310 in FIG. 13A, the pass concept icons 1320-1 through 1320-9 depicted in pass concept user interface 1302 are pass concepts that are or may be executed with drop back protection. The plays selection user interface 1302 illustrated in FIG. 13B indicates a hooks and curls icon 1320-4 as the pass concept selected by the vicarious coach.

FIG. 13C illustrates an intended receiver user interface 1303 that prompts the vicarious coach to identify the intended receiver from a list of potential receivers corresponding to intended receiver icons 1330-1 through 1330-15, which lists all running backs, tight ends, wide receivers. Intended receiver user interface 1303 illustrated in FIG. 13C also prompts the vicarious coach to indicate the quarterback who will throw the ball to the intended receiver. The illustrated user interface indicates user selection of a player wearing the number "9" as the quarterback and the wider receiver wearing number "19" as the intended receiver. In some embodiments, the vicarious coach may indicate default selections for one or more of the positions represented in user interface 1303. For example, a user may indicate the starting quarterback as the default quarterback for all plays on offense when the applicable team rarely substitutes the starting quarterback. The vicarious coach interface 1303 illustrated in FIG. 13C indicates "QB" icon 1330-1 as the passer and "WR" icon 1330-4 as the intended receiver.

Figure 14:
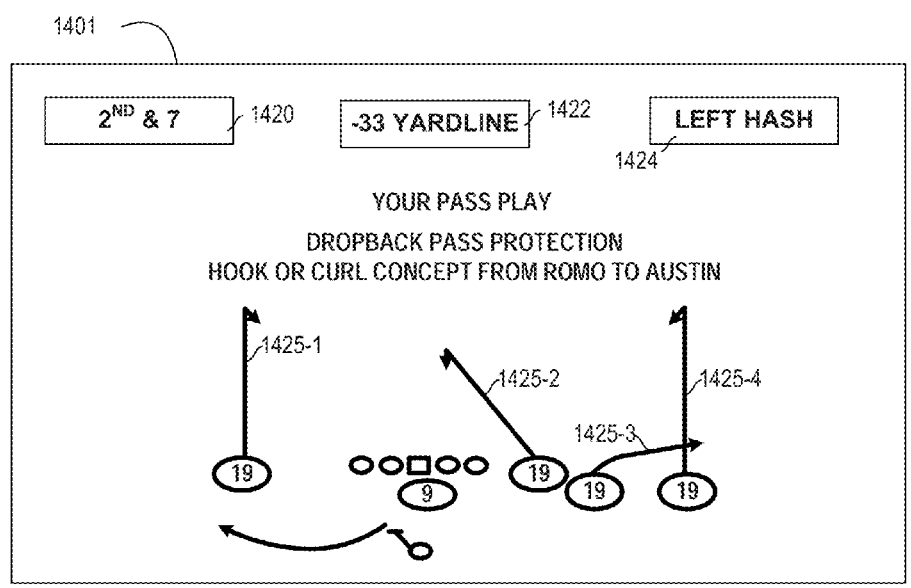
FIG. 14 illustrates an additional play selection user interface suitable for use with the method illustrated in FIG. 11.

Turning now to FIG. 14, a selected-play user interface 1401 presents the vicarious coach with the play selected by the player via the vicarious coach input provided in response to the user interfaces described above with respect to FIGS. 12A, 12B, 12C, 13A, 13B, and 13C. The selected-play user interface 1401 illustrated in FIG. 14A includes a down-and-distance indicator 1420, a line-of-scrimmage indicator 1422 and a hash mark indicator 1424. Some embodiments may include a game clock, scoreboard, or other formation or additional information while other embodiments may include less information. The illustrated embodiment of selected-play user interface 1401 includes the numbers of the players individually specified via the intended receiver user interface 1303 of FIG. 13C. Selected-play user interface 1401 illustrates pass routes that the intended receiver, wearing jersey number 19 in this illustrated example, may run within the pass concept specified by the vicarious coach in pass concept user interface 1302 of FIG. 13B. Selected player user interface 1401 illustrates the use of a play concept to specify a set of multiple pass routes for an individual player. As depicted in FIG. 14, for example, the hooks and curls concept selected by the vicarious coach via user interface 1302, coupled with the selection of the player wearing jersey number 19, results in the appearance of four different routes 1425-1 through 1425-4 for player number 19.

The selected-play user interface 1401 depicted in FIG. 14 does not depict a formation or play for the "other" team, the team on defense in the case of FIG. 14. At least one embodiment of the play selection applications described above with respect to FIG. 11 (vicarious coaching application) and FIG. 3 (coach/player application) may generate multiple icons after receiving all user inputs where the multiple icons represent the play selected by the user versus a number of formations that the opposing team may line up in. For example, if the user is on offense selecting a run play, the play selection application may provide the user with a plurality of images after determining which play the user has selected. In this example, the different images illustrate different defensive schemes the defense might line up in and may indicate to the offense different blocking schemes for each different defense illustrated. Similarly, if the user is on offense and selected a pass play, the application may present the user with a number of images representing different defensive formations and pass rush options with the different pass protection assignments applicable to each depicted defensive formation/pass rush permutation.

In the context of the coach/player application of FIG. 3, depicting all of the defensive formations and corresponding blocking assignments beneficially simplifies the task of constructing the portion of a playbook associated with the particular play by automatically enumerating some or all of the defenses that a team might expect to see in connection with a particular play and how the assignment of individual offensive players may change depending upon the defense. With respect to the vicarious coaching application described with respect to FIG. 11, presenting one or more defenses associated with a particular play may be optional. Some embodiments may permit the vicarious application player on offense to indicate an expected defense. If, however, a team is executing a hurry-up, no-huddle, or other portion of the playbook designed to reduce the amount of time spent in play calling huddles, the vicarious coach may lack sufficient time to make a defensive selection.

Figure 15A:
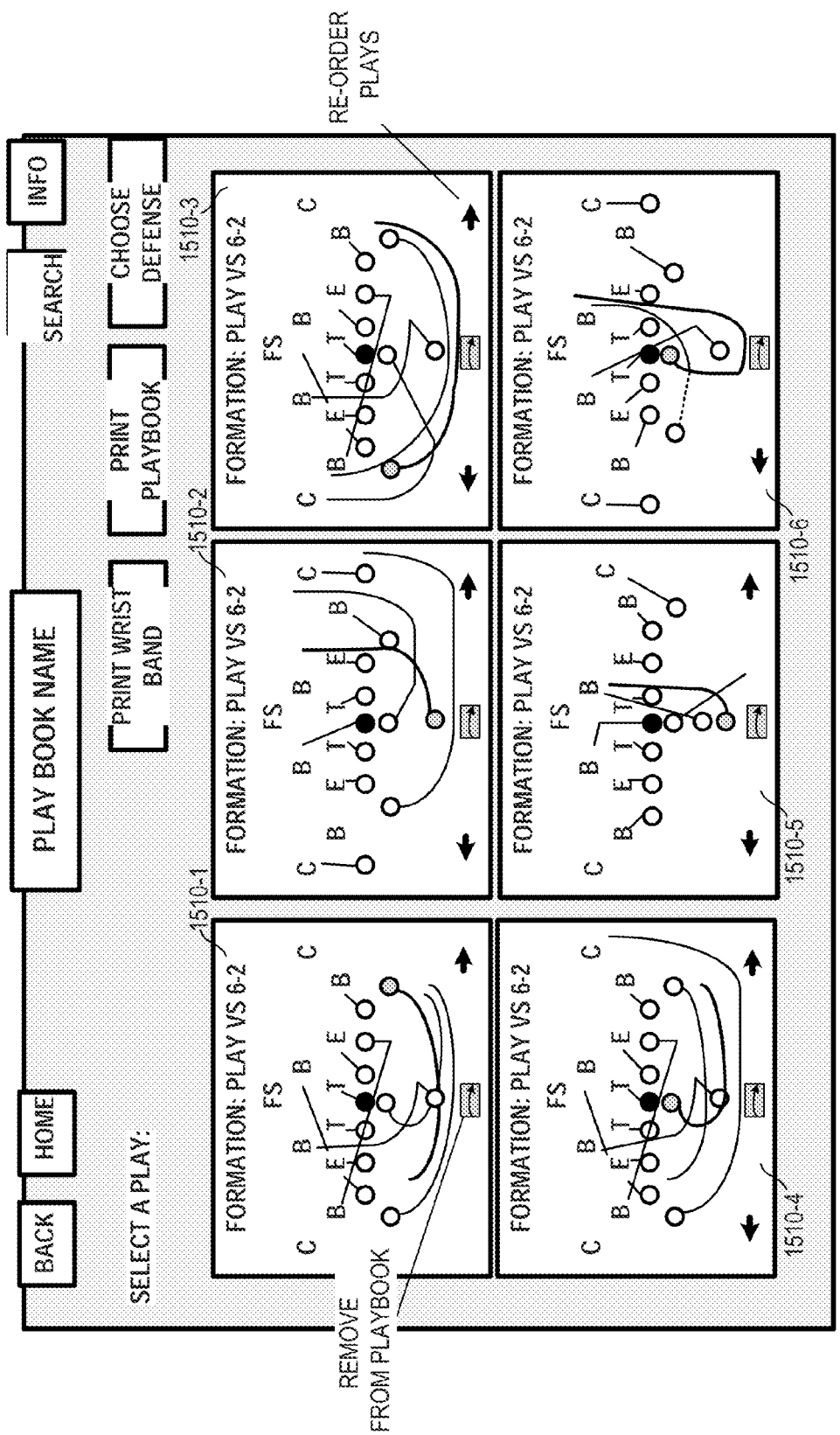
FIG. 15A, FIG. 15B, and FIG. 15C illustrate a collection of exemplary plays.
Figure 15B:
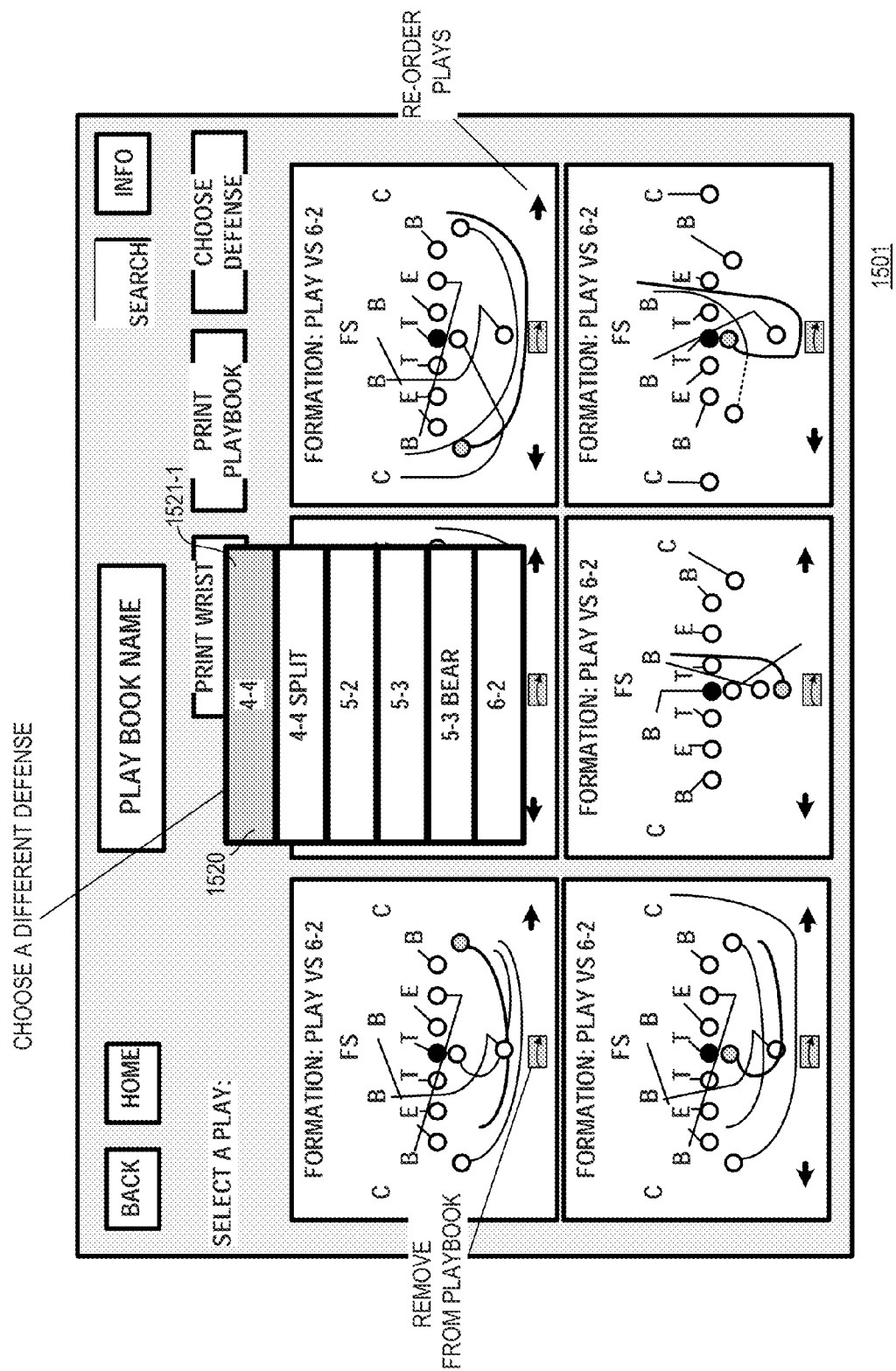
Figure 15C:
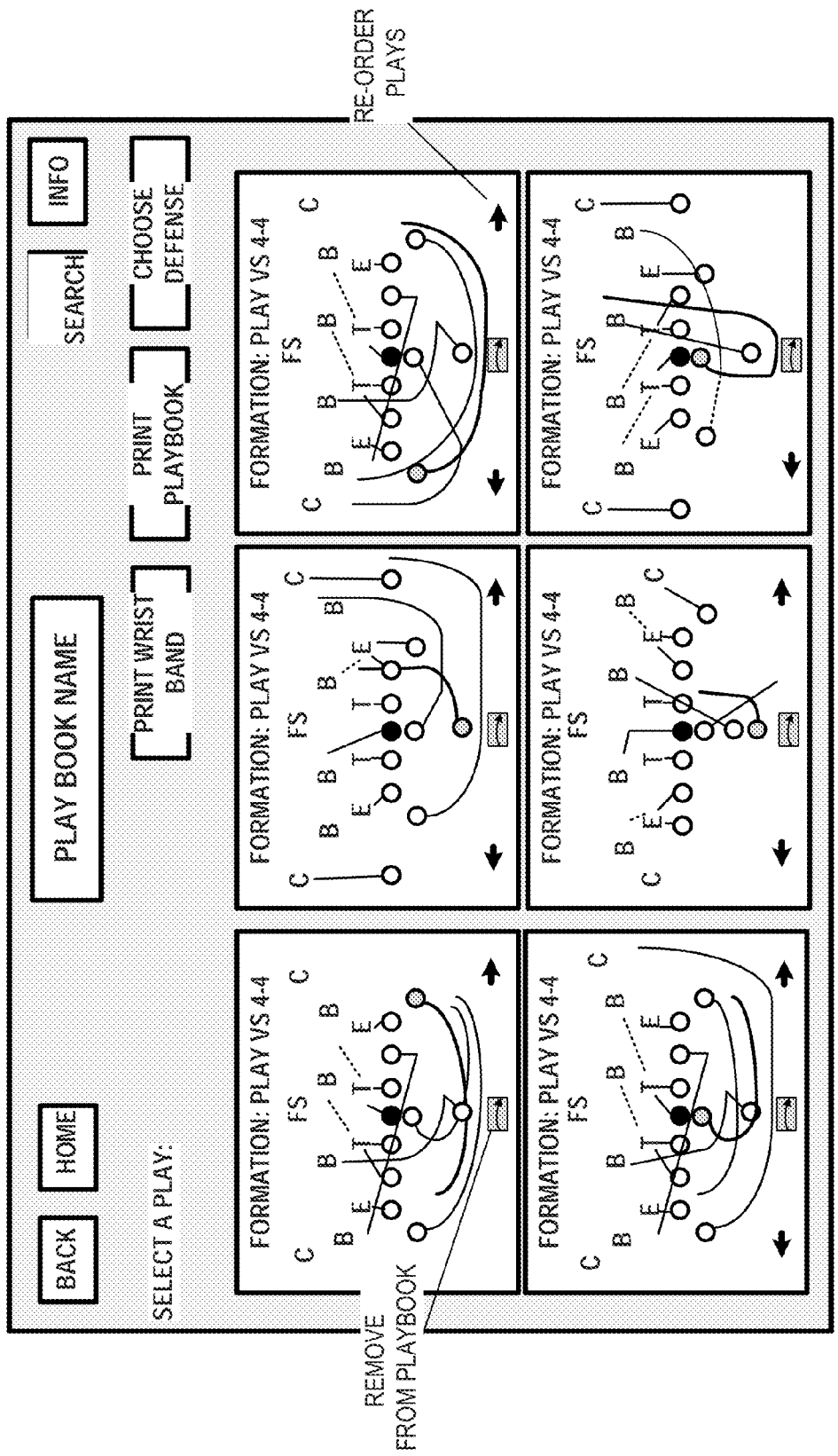

In some embodiments, a default defense is illustrated after a play selection process is completed and the vicarious coach interface enables the vicarious coach to select a different defense. Similarly, a collection of plays (e.g., all plays selected for a particular game or game plan) may be illustrated with respect to a default or specified defense while enabling the vicarious coach to select a different defense for each of the one or more plays indicated. FIG. 15A illustrates an example user interface 1501 illustrating a collection of plays 1510-1 through 1510-6 and their respective blocking scheme identified for use against a default defensive formation. FIG. 15B illustrates a defensive play selection drop down menu 1520 enabling the vicarious coach to select a different defense, e.g., a 4-4 defense via defensive formation icon 1521-1. FIG. 15C illustrates the same set of offensive plays 1501 illustrated in FIG. 15A with blocking assignments modified for the 4-4 defense that was selected in FIG. 15C.

Thus, it will be appreciated from all of the above that disclosed subject matter encompasses a variety of play selection methods. The play selection methods may be computerized methods that are performed by one or more hardware processors, of one or more servers, desktop or laptop computers, tablets, smart phones, or other types of mobile devices, or combinations thereof, executing computer executable program instructions stored in a hardware-based computer memory device, computer storage device, or another suitable type of computer readable storage medium, that is accessible to the processor(s). The play selection methods may be performed within a single system or within a client/server environment or another suitable type of network-distributed architecture.

At least one embodiment of a play selection method includes presenting a sequence of play selection user interfaces to a user, wherein any one or more of the play selection user interfaces may include one or more diagrams. The play selection method may include obtaining, receiving, detecting, or otherwise accessing, for each play selection user interface, a user input selecting one of a plurality of options that the play selection user interface presents to the user. The play called by the user is defined by the combination of user inputs provided to the play selection user interfaces. For example, an embodiment may present a user with a sequence of three play selection user interfaces for an upcoming play to be executed on the field, in which case, the play called by the user is defined by the three user inputs that the user provides, one user input for each of the three play selection user interfaces.

The options associated with any particular play selection user interface may be derived from a database of executed plays which may be referred to herein as a historical play set database or, more simply, a historical play set. A historical play set database suitable for use in play selection methods described herein may be associated with a particular football team, in which case, the data stored in the historical play set database may consist exclusively or primarily of data associated with plays executed by the particular football team. In other embodiments, data associated with historical plays executed by two or more teams may be combined within a single data base and filtered according to a team identification parameter when team-specific data is requested.

Although the team associated with a team-specific historical play set database may be substantially any team playing in substantially any league, some embodiments may support, provide access to, or otherwise emphasize historical play set databases of teams that are widely recognizable including, without limitation, professional teams playing in the (U.S.) National Football League, professional teams playing in the Canadian Football League, and major collegiate teams including (U.S.) NCAA Division I teams.

Team-specific historical play set databases support embodiments in which the play selection user interfaces presented to a user reflect one or more characteristics of the team-specific play set database. As an example, a route selection user interface that might be presented to a user who is calling offensive plays for a particular team and who has, via a play type user interface, called for a pass play, might present one set of route options for a team that regularly uses four wide receivers and another set of route options for a team that regularly uses one or two tight ends and one or two running backs.

In some embodiments, play selection methods based on team-specific historical play set databases may also provide historical likelihood information within the play selection user interfaces. The historical likelihood information, which may be indicated as a percentage, may convey the relative frequency with which the applicable team executes any given play selection user interface option. For example, an play selection method embodiment that presents the user with three play selection user interfaces including a play type user interface as the first play selection user interface, may offer the use three play type options: run, pass, and kick. In this example, the play selection user interface may indicate, for each of the three options, a historical likelihood percentage indicating how frequently the team chooses the applicable option. For example, a play type user interface might indicate a likelihood of 68% for the run option, 31% for the pass option, and 1% or less for the kick option for a team that relies heavily on running plays.

Historical likelihood percentages may be calculated based on the historical play set database as a whole or based on a portion of the database filtered according to one or more criteria. For example, a team-specific historical play set database may include data for ten or more seasons and, for purposes of determining historical likelihood percentages, some embodiments may define active play set criteria for filtering the historical play set database. As examples, an embodiment may define the active play set criteria as: all plays executed during the current season, all plays executed during the previous 15 regular season games, all plays executed in games in which the current quarterback was the starting quarterback, and so forth.

In addition to filtering a historical play set database according to an active play set criteria, which may be performed relatively infrequently, e.g., once for a season, once for a given game, etc., some embodiments may further filter the active play set more dynamically, using filter criteria that vary from one play to the next. For example, historical likelihood percentages may be calculated used a historical database that is filtered, beyond the active play set filtering, based on a down and distance criteria that may and most often will change from play to play. To illustrate, play selection method embodiments might filter the active play set database according to a down and distance criteria so that the historical likelihood percentage indicated for a run option presented within a play type user interface may indicate a higher percentage for a second-and-short situation than for a third-and-long situation. In some embodiments, the user may have control over some or all of the criteria used to filter a historical play set database so that the user can influence the historical likelihood percentages that are calculated. Permitting user specified play set filtering criteria may enable user with better insight into the parameters that influence a coach's play calling to receive historical likelihood percentages that are more accurate, or more predictive of what the coach is likely to call.

In various embodiments, historical play set criteria may include chronological criteria, including season criteria to define plays executed by a particular team during the current season, plays executed by the particular team during either the current season or the previous N seasons where N is an integer variable; recency criteria such as plays executed by the particular team during the previous N weeks where N is an integer variable, plays executed by the particular team during the last N games, and calendar criteria such as plays executed by the particular team in the month of November, plays executed by the particular team on Monday night games. Historical play set criteria may also include roster criteria such as plays executed by the particular team with a first particular player playing a first position, a second particular player playing a second position, etc.; and plays executed by the particular team with the first particular player on the active roster. Historical play set criteria may also include opponent criteria, such as plays executed by the particular team against a second team, plays executed by the particular team against a particular opposing player, plays executed by the particular team against a particular opposing coach, environmental criteria such as plays executed by the applicable team when the temperature at kickoff, halftime, the end of the game, or some other juncture drops below N degrees, plays executed by the particular team when temperature exceeds N degrees, plays executed by the particular team when average wind exceeds N mph, and situational criteria such as plays executed by the particular team in specific down-and-distance situations including, as non-limiting examples, plays executed on 2d down with less than 4 yards to go, plays executed on $3^{rd}$ down with more than 3 yards to go, plays executed on $2^{nd}$ down or $3^{rd}$ down with more than 7 yards to go, and so forth; plays executed by the particular team when inside the opponent's N yard line, plays executed by the particular team when inside their own N yard line, plays executed by the particular team in quarter N when leading by more than M points, and so forth. The historical play set criteria listed above represent criteria that may be of interest, but other criteria, not explicitly identified herein, may be employed. In at least some embodiments, some historical play set criteria may be used apply on every play while other historical play set criteria may change from play to play. For example, the play database for a particular team may include data representing every play executed by the team during the current season and the previous ten seasons. In this case, some embodiments may use a chronological filter to filter the "active" play set down to plays executed during the previous 15 regular season games. Some embodiments may then use a down and distance criteria to filter the active play set according to the down and distance of the upcoming play. In this example, the play selection user interface options and any corresponding historical likelihood information that are presented to the user in $1^{st}$ and 10 situations would be derived from plays executed by the particular team in $1^{st}$ and 10 situations during the previous 15 regular season games. If the team gains 4 yards on $1^{st}$ down, the play selection user interface options and any corresponding historical likelihood information presented to the user would be derived from plays executed by the particular in $2^{nd}$ and 6 or $2^{nd}$ and long, or some other down and distance criteria, during the previous 15 regular season games.

Various play selection user interfaces may be employed. A play type user interface enabling a user to select a type of play may be associated with a play type parameter that has a defined set of possible values, e.g., run, pass, or kick. Other play selection user interfaces may include, as non-limiting examples: an offense/defense interface associated with an offense/defense parameter enabling a user to elect whether to call plays for the offense or defense; an initial formation interface associated with an initial formation parameter enabling a user to select the pre-snap formation; a protection interface associated with a protection interface enabling a user to select a protection scheme, an intended target or ball handler interface enabling a user to identify the intended receiver for a pass play or the runner for a running play; a route concept interface associated with a route concept parameter enabling a user to select a particular route concept; and a route interface associated with a route parameter enabling a user to identify a particular route.

In the context of a vicarious coaching application, the method may further include receiving, during a play identification interval after execution of the play, play identification information indicative of the play executed on the field and comparing the play called by a user to the play executed on the field to determine a similarity between the play call and the executed play. The method may still further include maintaining similarity data indicative of the similarity between each of a plurality of play calls associated with a user and the corresponding executed plays over a predetermined interval, and maintaining comparative data indicative of the similarity of the user relative to other users in a predetermined group of users. In the context of a coach/player game plan application, the method may include accessing, based on the selected play, selected video in a video database wherein the selected video comprises video of the selected play.

Referring now to FIG. 16 through FIG. 20, a series of play selection user interfaces illustrate an exemplary implementation of a play selection method performed within a vicarious coaching application. In the implementation illustrated in FIG. 16 through FIG. 20, which represents one non-limiting embodiment, the vicarious coaching application employs three play selection user interfaces corresponding to three play selection parameters. In addition, at least one or more of the play selection user interfaces reflects team-specific historical play set data and indicates a historical likelihood for one or more of the play parameter options presented within the applicable user interface.

In addition to the use of historical data on or in conjunction with at least one of the play selection user interfaces, the vicarious coaching application illustrated in FIG. 16 through FIG. 20 identifies a play executed on the field using any of a variety of play identification technologies described previously. In at least one embodiment, the vicarious coaching application generates a score or evaluation of each play called by a vicarious coach after the play executed on the field is identified. The vicarious coaching application may use a multiple-factor evaluation algorithm, a multi-factor set of rules, a multi-factor look up table, or a combination thereof to determine the score or evaluation.

In at least one embodiment, the vicarious coaching application evaluates a vicarious coach's play call based on one or more factors including, as a first factor, a degree of similarity between the play called by the vicarious coach and the play executed on the field. In some embodiments, The evaluation or score of a vicarious coach's play call may further depend upon a second factor, such as the success or a failure of the play executed on the field. Although there are numerous implementation details associated with two-factor scoring as described herein, generally, higher scores are associated with greater degrees of similarity when the play executed on the field is successful. When the executed play executed unsuccessful, various alternative scoring rules may be used to award at least some points to a vicarious coach who called a play that was different in at least one play selection parameter from the play executed on the field.

In at least one embodiment, the vicarious coaching application employs or supports a set of three play parameters and three corresponding play selection user interfaces. The three place selection user interfaces include a play type user interface illustrated and described with respect to FIG. 16, an ball handler user interface illustrated and described with respect to FIG. 17, and an assignment or route user interface depicted and described with respect to FIG. 18. In at least one implementation of this three-parameter embodiment of the vicarious coaching application, a maximum score of 3X may be achieved, with X points being awarded for each parameter of the play called by the vicarious coach that matches the corresponding parameter of the play executed on the field.

If the play executed on the field is successful, the vicarious coach may receive, for example, 10 points for each play parameter that the user calls in common with the corresponding play parameter called by the coach on the field. For a pass play, as an example, a successful pass play executed on the field may result in a score of 30 points for a vicarious coach that called a pass play to the same intended receiver running the same route as the play that executed on the field. If the play executed on the field is unsuccessful, the player may receive five points for each play parameter that is different than the corresponding play parameter of the executed place. If a pass play is unsuccessful, the vicarious coach may receive, just as examples, 5, 10, or 15 points for calling a run play, 5 points for calling a pass play to a different intended receiver, 5 points for calling a pass play identifying a different route, and 10 points for calling a pass play with a different intended receiver and route.

Other embodiments may employ different scoring models in recognition of the reality that, when the play executed on the field is unsuccessful, awarding points based on a difference between the play called by the vicarious coach is a speculative because it cannot be known whether the play called by the vicarious coach would have been successful.

Some embodiments may recognize the concept of risk during place selection by offering higher scores for vicarious coaches that call a play that is less likely to be called by the applicable team when the vicarious coach's call turns out to match the play called on the field and the play executed on the field is successful. For example, in at least one embodiment, a player may receive a higher score for calling a running play involving the fullback on a second and the long call than for calling a pass to the tight end under the same circumstances if the historical data indicates that the team is far more likely to throw to the tight end than to run the fullback on second and long.

The combination of using (1) historical data to influence the play selection user interfaces, (2) a sequence of three play selection user interfaces to define a play call, and (3) multifactor scoring that takes into account, not only the similarity between a vicarious coach's play call and the play executed on the field, but also the success or failure of the play executed on the field, results in a better vicarious coaching experience than a single decision (pass or play) fantasy application might provide.

Figure 16:
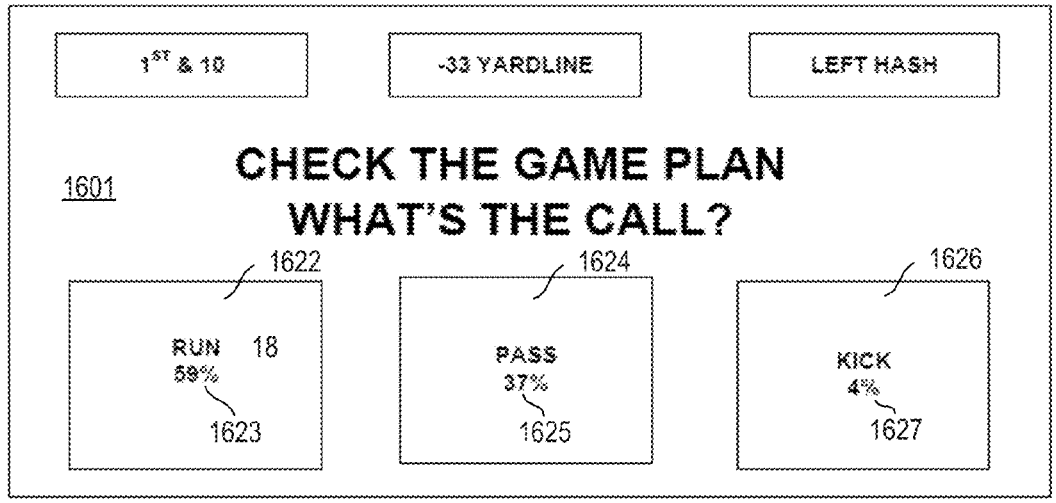
FIG. 16 illustrates a play type user interface, on first down, including historical likelihood information for each play type option included in the interface.

Turning now to FIG. 16, a play type user interface 1601 for use in a vicarious coaching application that employs historical data is illustrated. The play type user interface 1601 illustrated in FIG. 16, includes a set of play type icons corresponding to the play type options that play type user interface 1601 provides. The play type user interface illustrated in FIG. 16 includes a run icon 1622, a pass icon 1624, and a kick icon 1626, similar to elements of play selection user interface 1202 illustrated with respect to FIG. 12B.

However, the play type user interface 1601 indicates, in each of the play type icons (1622, 1624, and 1624), historical likelihood data indicating the percentage of all plays executed by the applicable team that match. In the play type user interface 1601 illustrated in FIG. 16, the run icon 1622 includes historical likelihood data 1623 indicating that 59% of plays executed by the applicable team are run plays, pass play icon 1624 includes historical likelihood data 1625 indicating that 37% of plays executed by the applicable are pass plays, and kick icon 1626 includes historical likelihood data 1627 indicating that the applicable team kicks the ball 4% of the time.

As described previously, historical likelihood information may indicate a historical percentage that is determined with respect to a subset of all plays executed by the applicable team or all players executed by the team during a specified historical period, for example, during the current season, during the last 10 games, during the last two seasons, and so forth. In addition, the historical likelihood percentage may reflect further filtering of a play set database including filtering according to dynamic factors such as down-and-distance, line-of-scrimmage, and so forth. Thus for example, the 59% value for historical likelihood 1623 may, in one instance, represent the percentage of run plays executed by the applicable team, during a defined historical period, in first-and-10 situations when the line-of-scrimmage is between the opposing 20 yard lines. The set of plays considered in the determination of a historical percentage may be filtered according to any of the factors for categorizing or characterizing football plays described herein.

Figure 17:
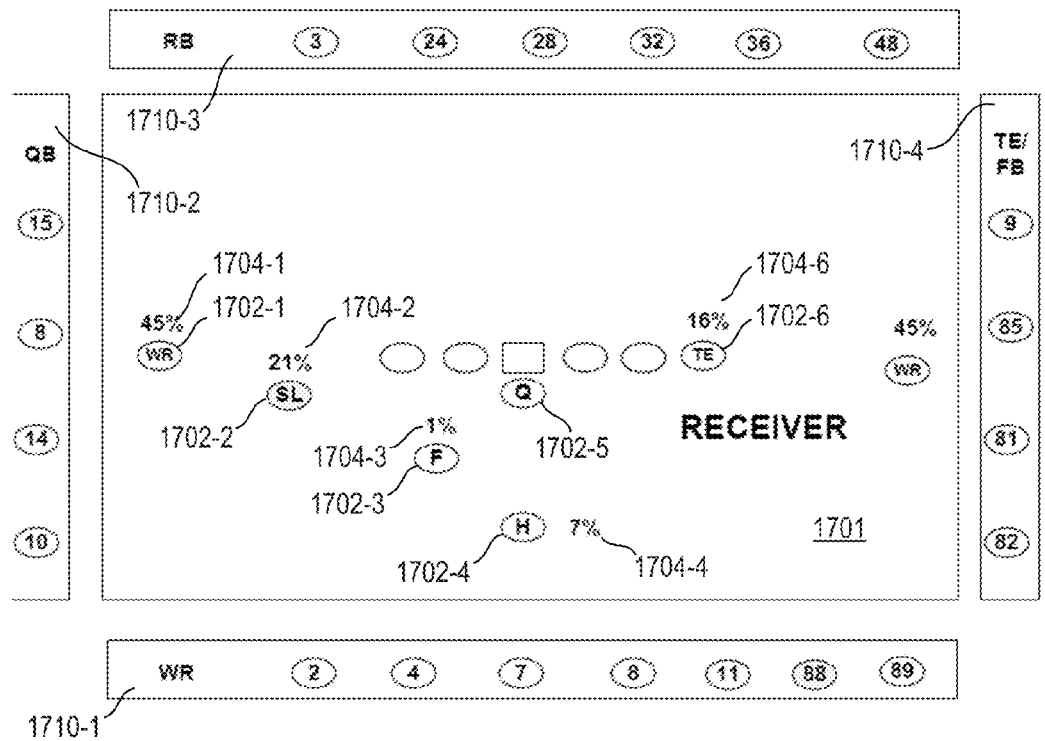
FIG. 17 illustrates a ball handler user interface employing an indication of historical play selection data.

FIG. 17 illustrates a ball handler user interface 1701 that enables the vicarious coach to identify the intended ball handler for a play, whether the intended ball handler be the intended receiver of a pass play or the runner for a run play. The ball handler user interface 1701 illustrated in FIG. 17 enables a vicarious coach to identify the intended ball handler by either indicating a specific player explicitly, using the player's uniform number, or by indicating a position such as wide receiver, slot receiver, tight end, fullback, or halfback. The vicarious coach may specify the target by position by selecting one of the position icons 1702-1 through 1702-6. Each of which is shown with corresponding historical percentages 1704-1 through 1704-6. Alternatively, the vicarious coach may indicate a specific player as the intended target by selecting from one of the player selection bars 1710-1 through 1710-4, one of which is included for each position or combination of positions. A vicarious coach who wishes to identify the player wearing a uniform number 88 as the designated target would select the uniform number icon 1706 corresponding to uniform number 88 in the wide receiver selection bar 1710-1. The player position user interface 1701 illustrated in FIG. 17 depicts a formation that includes a total of 12 players which is, of course, more than the 11 players allowed. However the 12 player interface beneficially enables the player position selection through a single interface that includes icons for positions that may not occur at the same time. For example, although the fullback may not be included in a particular formation, player position user interface 1701 includes the fullback icon 1702-3 to accommodate plays that include a fullback.

Figure 18:
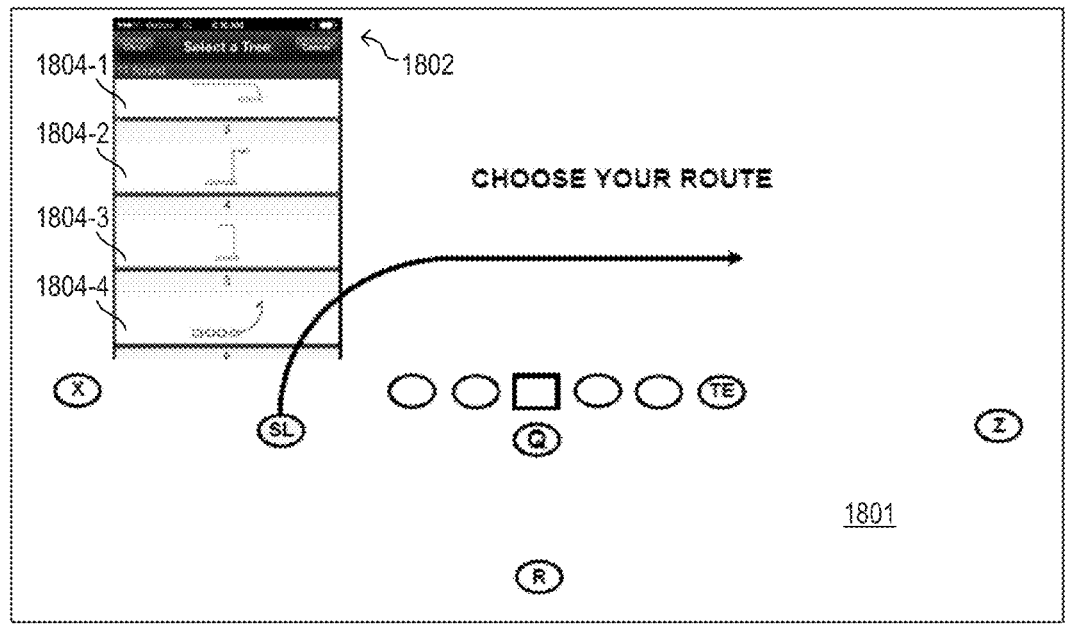
FIG. 18 illustrates a route selection user interface.

Referring now to FIG. 18, an assignment or route user interface 1801 is illustrated. The assignment user interface 1801 illustrated in FIG. 18 indicates a number of possible routes for the intended target which, in the illustrated example, is the slot receiver SL. The available routes are indicated graphically in a route selection window 1802. The route selection window 1802 illustrated in FIG. 18 depicts four different route assignments 1804-1 through 1804-4. Other route selection windows 1802, not depicted, may depict fewer or more route assignments 1804. Although route selection window 1802 is shown without historical likelihood information presented for each of the route assignment 1804, other embodiments may indicate historical likelihood information for one or more of the route assignments 1804.

Figure 19:
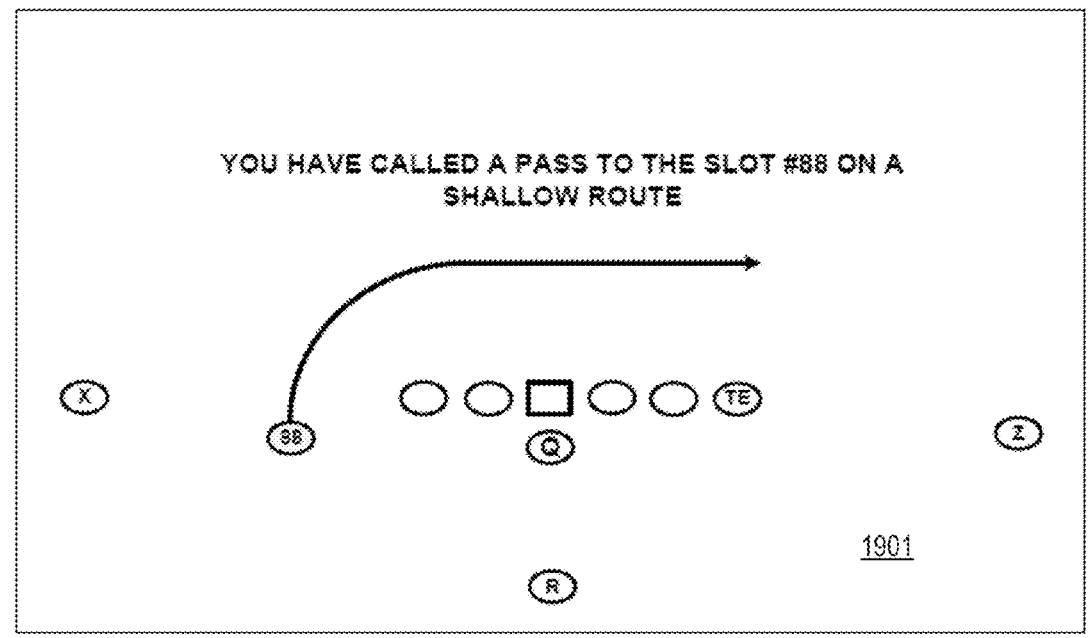
FIG. 19 illustrates a play selection summary user interface.

FIG. 19 illustrates a play selection summary user interface 1901 that depicts the play called by the vicarious coach graphically and textually. In at least one embodiment, the vicarious coach may be able to edit one or more of his or her selections by clicking or tapping on the indication of the selection in either the textual or graphical summary. For example, clicking on the word "PASS" may reset the selection and provide the user with a play selection user interface 1601 and each of the subsequent play selection user interfaces 1701 and 1801. If an attempt to edit or revise a play selection is not received before the execution of the next play on the field or before a particular time deadline that may occur before the next play is snapped, some embodiments may use the originally selected play for scoring purposes.

Figure 20:
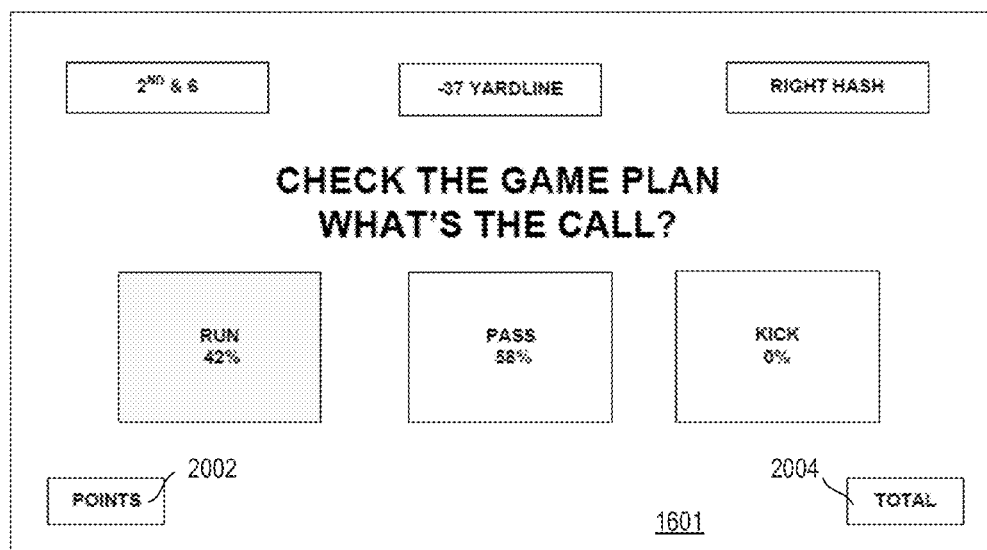
FIG. 20 illustrates the play type user interface of FIG. 16 on second down.

FIG. 20 illustrates the beginning of the next play cycle by presenting the play selection user interface 1601, substantially similar to the user interface 1601 depicted in FIG. 16, with the down-and-distance information updated to reflect the execution of the first down play and with the inclusion of a scoring indicator 2002 indicating the score received by the vicarious coach for the previous play as well as the cumulative score or total score for the user in a cumulative score indicator 2004.

As indicated previously, play result information included in executed play information may indicate the success or failure of the executed play according to a set of one or more criterion. Referring now to FIG. 21, a success table 2101 defining the result of an executed play as either a success or failure is illustrated. The success table 2101 illustrated in FIG. 21 conveys a success criteria according to the down-and-distance preceding the executed play. The success table 2101 illustrated in FIG. 21 includes a set of four down-and-distance tables, 2102-1 through 2102-4, defining success for each down-and-distance combination. A first down-and-distance table 2102-1 defines success for plays executed on first down, a second down-and-distance table 2102-2 defines success for plays executed on second down, and so forth.

Each down-and-distance table 2102 illustrated in FIG. 21 includes a plurality of entries with each entry including a value for a distance parameter 2104 and a result parameter 2106. The distance parameter 2104 indicates the distance required for a first down while the result parameter 2106 indicates the minimum yardage required for the play to be classified as a successful play. For example, the success table 2101 illustrated in FIG. 2 classifies a first and 10 play, according to first down-and-distance table 2102-1, as a successful play if the offense gains four or more yards. Thus, the executed play is identified as a success if, on first and 10, the executed play gains four or more yards.

The first down-and-distance table 2102-1 illustrated in FIG. 21 includes an explicit entry for each value of the distance parameter 2104 between 1 and 15. The first down-and-distance table 2102-1 illustrated in FIG. 1 further includes a single entry 2112, applicable to all distances of 16 or more yards, indicating that the play is successful if the yardage gained is 50% or more of the first down yardage needed. Thus, the first down-and-distance table 2102-1 illustrated in FIG. 21 includes both table-based criteria, such as the entry 2110, and formulaic or algorithmic criteria such as entry 2112. Other embodiments may use different table-based criteria as well as different algorithmic criteria, and different combinations of the two.

Some embodiments of a vicarious coaching application may employ a plurality of success tables, such as the success table 2101 of FIG. 21. In these embodiments, the success table invoked to evaluate the success of an executed play may be selected based on various factors such as the score of the game on the field, the field position or line-of-scrimmage, and the time remaining. For example, the success table 2101 illustrated in FIG. 21 may be invoked as a default success table used, for example, for any play in which: the line-of-scrimmage is between the 20 yard lines, there is more than 10 minutes remaining in the first half or 10 minutes remaining in the game, and the score is relatively even, i.e., less than 10 points separate the two teams.

Referring now to FIG. 22, a success table 2201 for use in goal line situations is shown. The success table 2201 illustrated in FIG. 22, similar to the success table 2101 illustrated in FIG. 21, includes a set of down-and-distance tables 2202-1 through 2202-4, with down-and-distance table 2202-1 corresponding to first and goal situations, down-and-distance table 2202-2 corresponding to second and goal situations, and so forth. Again, similar to success table 2101 illustrated in FIG. 21, the down-and-distance tables 2202 illustrated in FIG. 22 include a distance column 2204 and a result column 2206. The success table 2201 of FIG. 22 includes a highlighted entry 2210 indicating that, when a team is in a first and goal-to-go situation at the 7 yard line, success is defined as a play gaining four or more yards. The specific down-and-distance criteria listed in the down-and-distance tables 2202 of success table 2201 are exemplary and other implementations may employ different values for the same down-and-distance situations. Similarly, different success tables may be employed in situations other than the situations described above with respect to FIG. 21 and FIG. 22.

Figure 23:
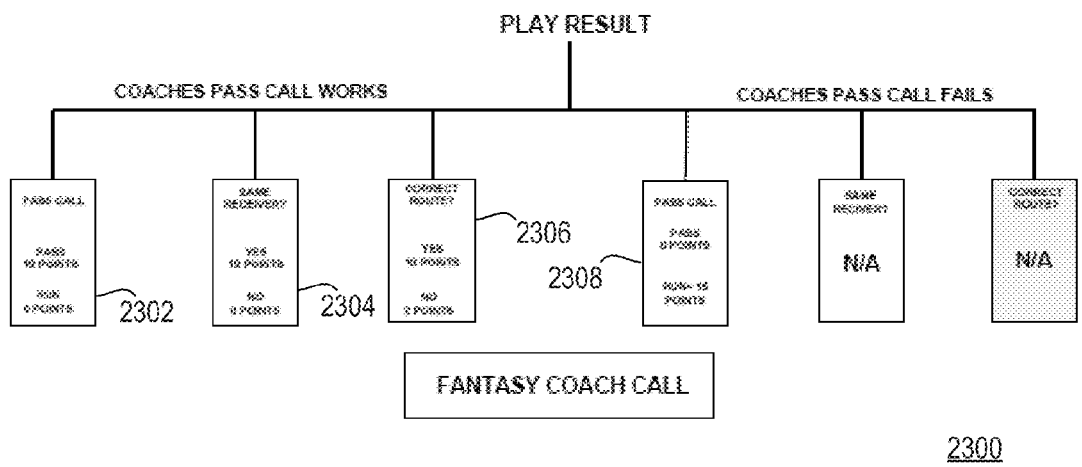
FIG. 23 illustrates vicarious coaching scoring rules for a pass play.
Figure 24:
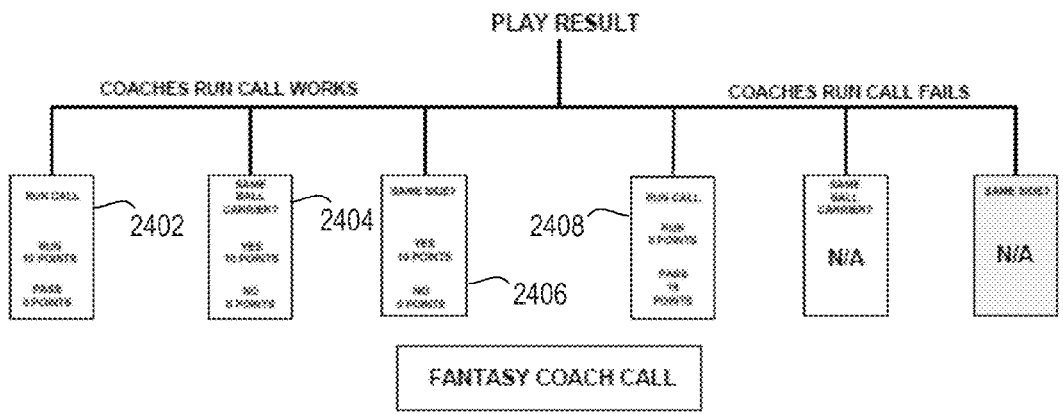
FIG. 24 illustrates vicarious coaching scoring rules for a run play.

Referring now to FIG. 23 and FIG. 24, FIG. 23 illustrates a scoring chart 2300 suitable for scoring when the executed play is a pass play. For the scoring chart 2300 illustrated in FIG. 23, the vicarious coach's score is determined based play called, the play executed, and the result of the executed play as described above with respect to FIG. 21 and FIG. 22. In the scoring illustrated in FIG. 23, if the executed play is a success, the vicarious coach's score is determined based upon the number of play selection parameters selected by the vicarious coach that match the parameters of the executed play.

For a vicarious coaching application that presents the vicarious coach with three play selection parameters per play, the vicarious coach may receive 10 points for calling a pass play as suggested in block 2302, 10 points for calling a pass play to the same receiver that was used in the executed play as suggested in block 2304, and 10 points (block 2306) for calling the same route as the coach on the field for a maximum point total of 30 points. In the exemplary scoring chart 2300 illustrated with respect to FIG. 23, the vicarious coach who calls a run play when the executed play was a pass that failed, may receive 15 points (block 2308) for calling a run play.

Other embodiments may implement different scoring mechanisms to account for unknown variables when the executed play fails. For example, whereas block 2308 indicates that the vicarious coach receives zero points for calling a pass play when the executed play is a pass play that fails, other embodiments may look to whether the vicarious coach identified a different receiver and/or a different route than the coach on the field. If the vicarious coach called a pass play to a different receiver running a different route, some embodiments may give the vicarious coach some partial credit.

FIG. 24 illustrates an exemplary scoring chart 2404 scoring a vicarious coach when the executed play is a running play. Like the scoring chart 2300 illustrated in FIG. 23, the scoring chart 2400 illustrated in FIG. 24 is suitable for a vicarious coaching application that prompts the vicarious coach for three play selection parameters. If the executed play is a running play that is successful, the vicarious coach receives 10 points for calling a running play as indicated in block 2402, 10 points for calling a run using the same ball carrier as the coach on the field (block 2404), and 10 points for calling a play to the same side of the field as the coach on the field (block 2406).

Like the scoring chart 2300 illustrated in FIG. 3, the scoring chart 2400 illustrated in FIG. 24 rewards the vicarious coach with 15 points for calling a pass play when the executed play was a run that failed and zero points for calling a running play when the executed plate was a run play that failed. parentheses block 2408 parentheses. However, as was true with respect to chart 2300 of FIG. 23, other scoring systems may reward the vicarious coach some partial credit for calling a different ball carrier and or a different side of the field even if the executed plane is a running play that fails. In the examples illustrated in FIG. 23 and FIG. 24, a vicarious coach might receive a maximum of 30 points per play and in some embodiments, the vicarious coach's score for each play is recorded and accumulated.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A vicarious coaching method, comprising:
generating, for a user of a vicarious coaching application, a plurality of play selection user interfaces associated with a first team playing football against a second team, the plurality of play selection user interfaces including a first play selection user interface corresponding to a first play parameter and indicating a plurality of first play parameter options, wherein the first play selection user interface is generated based, at least in part, on historical data indicative of previous plays executed by the first team and wherein the plurality of first play parameter options includes a first option and the first play selection user interface indicates a historical likelihood for the first option;
responsive to receiving user inputs to the plurality of play selection user interfaces, identifying a play called by the user;
obtaining play identification information, indicative of a play executed by the first team, wherein the play identification information includes a plurality of player location signals generated by a corresponding plurality of player location transmitters;
determining the play executed by the first team based on the play identification information; and
responsive to determining the play executed by the first team and obtaining information indicative of a result of the play executed by the first team, scoring the play called by the user based, at least in part, on:
the play executed by the first team; and
the result of the play executed by the first team.

2. The method of claim 1, wherein the first play selection user interface indicates a historical likelihood for each of the first play parameter options.

3. The method of claim 1, further comprising, filtering the historical data with respect to situation criteria to identify the previous plays.

4. The method of claim 3, further comprising, wherein the situation criteria include any one or more criteria selected from: season criteria, recency criteria; down-and-distance criteria, game clock criteria, game score criteria, opponent criteria, player criteria; and environmental criteria including temperature criteria, wind criteria, time of day criteria, and calendar-date criteria.

5. The method of claim 1, wherein the play identification information further includes one or more still images of the play executed by the first team.

6. A vicarious coaching method, comprising:
generating, for a user of a vicarious coaching application, a plurality of play selection user interfaces associated with a first team playing football against a second team, the plurality of play selection user interfaces including a first play selection user interface corresponding to a first play parameter and indicating a plurality of first play parameter options, wherein the first play selection user interface is generated based, at least in part, on historical data indicative of previous plays executed by the first team;
responsive to receiving user inputs to the plurality of play selection user interfaces, identifying a play called by the user; and
obtaining play identification information, indicative of a play executed by the first team, wherein the play identification information includes a plurality of player location signals generated by a corresponding plurality of player location transmitters;
determining the play executed by the first team;
obtaining information indicative of a result of the play executed by the first team; and
scoring the play called by the user based, at least in part, on:
the play executed by the first team; and
the result of the play executed by the first team, wherein scoring the play includes:
determining a similarity between the play called by the user and the play executed by the first team;
identifying the result of the play executed by the first team as either successful or unsuccessful;
assigning, for a successful result of the play executed by the first team, a higher score for greater similarity; and
assigning, for an unsuccessful result of the play executed by the first team, a higher score for less similarity.

7. The method of claim 6, wherein determining the similarity includes identifying a value for each of the play selection parameters and comparing each of the identified values to the corresponding value of the play called by the user.

8. The method of claim 6, wherein identifying the result comprises determining the result based at least on: a down-and-distance and a yardage gained.

9. The method of claim 8, wherein determining the result of the play executed by the first team is further based on a situation factor, wherein the situation factor reflects at least one of: a yard line of the line-of-scrimmage, a game score, a game clock, and number of time outs.

10. The method of claim 6, wherein the plurality of first play parameter options include a first option and wherein the first play selection user interface indicates a historical likelihood for the first option.

11. The method of claim 6, wherein the first play selection user interface indicates a historical likelihood for each of the first play parameter options.

12. The method of claim 6, further comprising:
filtering the historical data with respect to situation criteria to identify the previous plays.

13. The method of claim 12, wherein the situation criteria include any one or more criteria selected from: season criteria, recency criteria; down-and-distance criteria, game clock criteria, game score criteria, opponent criteria, player criteria; and environmental criteria including temperature criteria, wind criteria, time of day criteria, and calendar-date criteria.

14. The method of claim 6, wherein obtaining the play identification information comprises determining the play executed by the first team based on a plurality of still images of the play executed by the first team.

15. The method of claim 1, wherein determining the similarity includes identifying a value for each of the play selection parameters and comparing each of the identified values to the corresponding value of the play called by the user.

16. The method of claim 1, wherein identifying the result of the play executed by the first team comprises determining the result based at least on: a down-and-distance and a yardage gained.

17. The method of claim 1, wherein determining the result of the play executed by the first team is further based on a situation factor, wherein the situation factor reflects at least one of: a yard line of the line-of-scrimmage, a game score, a game clock, and number of time outs.

* * * * *